United States Patent
Jang et al.

(10) Patent No.: US 11,956,428 B2
(45) Date of Patent: *Apr. 9, 2024

(54) IMAGE CODING/DECODING METHOD AND APPARATUS THEREFOR

(71) Applicant: LG ELECTRONICS INC., Seoul (KR)

(72) Inventors: Hyeongmoon Jang, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

This patent is subject to a terminal disclaimer.

(21) Appl. No.: 17/570,086

(22) Filed: Jan. 6, 2022

(65) Prior Publication Data

US 2022/0182619 A1   Jun. 9, 2022

Related U.S. Application Data

(63) Continuation of application No. 16/327,192, filed as application No. PCT/KR2017/009106 on Aug. 21, 2017, now Pat. No. 11,240,495.

(Continued)

(51) Int. Cl.
*H04N 19/117* (2014.01)
*H04N 19/119* (2014.01)
(Continued)

(52) U.S. Cl.
CPC ......... *H04N 19/117* (2014.11); *H04N 19/119* (2014.11); *H04N 19/14* (2014.11);
(Continued)

(58) Field of Classification Search
CPC .... H04N 19/117; H04N 19/119; H04N 19/14; H04N 19/176; H04N 19/182;
(Continued)

(56) References Cited

U.S. PATENT DOCUMENTS

2012/0287994 A1   11/2012 Auwera et al.
2013/0022107 A1   1/2013 Auwera et al.
(Continued)

FOREIGN PATENT DOCUMENTS

CN   102550026   7/2012
CN   102934436   2/2013
(Continued)

OTHER PUBLICATIONS

Algorithm description of Joint Exploration Test Model 3 (JEM3), Joint Video Exploration Team (JVET) of ITU-T SG 16 WP 3 and ISO/IEC JTC 1/SC 29/WG 11 3rd Meeting: Geneva, CH, May 26-Jun. 1, 2016.*

(Continued)

*Primary Examiner* — Zhitong Chen
(74) *Attorney, Agent, or Firm* — Fish & Richardson P.C.

(57) ABSTRACT

The present invention discloses an image coding/decoding method and an apparatus for the method. More specifically, a method for filtering an image by a decoding apparatus comprises deriving boundaries of a block divided into quad-tree plus binary-tree structure; determining an edge among boundaries of the block to which de-blocking filtering is applied; determining a type of de-blocking filtering to be applied to the edge; and performing de-blocking filtering to a picture sample restored according to the de-blocking filtering type, wherein the edge or the type of de-blocking filtering is determined by considering width or height of the block.

7 Claims, 32 Drawing Sheets

Related U.S. Application Data

(60) Provisional application No. 62/377,671, filed on Aug. 21, 2016.

(51) Int. Cl.
```
H04N 19/14      (2014.01)
H04N 19/176     (2014.01)
H04N 19/182     (2014.01)
H04N 19/186     (2014.01)
H04N 19/86      (2014.01)
H04N 19/96      (2014.01)
```

(52) U.S. Cl.
CPC ......... *H04N 19/176* (2014.11); *H04N 19/182* (2014.11); *H04N 19/186* (2014.11); *H04N 19/86* (2014.11); *H04N 19/96* (2014.11)

(58) Field of Classification Search
CPC ...... H04N 19/186; H04N 19/86; H04N 19/96; H04N 19/132
See application file for complete search history.

(56) References Cited

U.S. PATENT DOCUMENTS

| | | | |
|---|---|---|---|
| 2015/0350687 A1 | 12/2015 | Zhai et al. | |
| 2018/0310015 A1* | 10/2018 | Han | H04N 19/117 |
| 2019/0261021 A1* | 8/2019 | Ikeda | H04N 19/182 |

FOREIGN PATENT DOCUMENTS

| | | |
|---|---|---|
| CN | 102948146 | 2/2013 |
| CN | 103430537 | 12/2013 |
| CN | 103535034 | 1/2014 |
| CN | 103718552 | 4/2014 |
| JP | 2013524715 | 6/2013 |
| JP | 2014511632 | 5/2014 |
| JP | 2014516219 | 7/2014 |
| JP | 2014525193 | 9/2014 |
| KR | 20110114498 | 10/2011 |
| KR | 20130129380 | 11/2013 |
| KR | 20140016375 | 2/2014 |
| KR | 20140071316 | 6/2014 |
| KR | 20140098672 | 8/2014 |
| WO | WO2011129619 | 10/2011 |
| WO | WO2012077608 | 6/2012 |

OTHER PUBLICATIONS

Norkin, A., Andersson, K., Fuldseth, A. and Bjøntegaard, G., Oct. 2012, HEVC deblocking filtering and decisions. In Applications of Digital Image Processing XXXV (vol. 8499, p. 849912). International Society for Optics and Photonics (Norkin).*
Office Action in Chinese Appln. No. 201780063381.X, dated Jan. 29, 2022, 20 pages (with English translation).
Office Action in Korean Appln. No. 10-2019-7005634, dated Feb. 11, 2022, 11 pages (with English translation).
Algorithm description of Joint Exploration Test Model 3 (J EM3), Joint Video Exploration Team (JVET) of ITU-T SG 16 WP 3 and IS0/IEC JTC 1/SC 29/WG 11 3rd Meeting: Geneva, CH, May 26-Jun. 1, 2016.
Chen et al., "Algorithm Description of Joint Exploration Test Model 3," JVET-C1001 v1, Joint Video Exploration Team (JVET) of ITU-T SG 16 WP 3 and 1S0/IEC JTC 1/SC 29/WG 11, Geneva, CH, dated May 26-Jun. 1, 2016, 35 pages, XP030150223.
Chinese Office Action in CN Appln. No. 201780063381.X, dated Dec. 23, 2020, 22 pages (with English translation).
EP Office Action in European Appln. No. 17843912.1, dated May 20, 2021, 6 pages.
Extended European Search Report in European Application No. 17843912.1, dated Mar. 16, 2020, 10 pages.
International Search Report in International Appln. No. PCT/KR2017009106, dated Dec. 11, 2012, 13 pages (with English Translation).
Jang et al., "Parallel deblocking filter for QTBT," JVET-D0044, Joint Video Exploration Team (JVET) of ITU-T SG 16 WP 3 and 1S0/IEC JTC 1/SC 29/WG 11, Chengdu, CN, dated Oct. 15-21, 2016, 4 pages, XP030150272.
Kim et al., "Improvement of chroma deblocking filter," JVET-D0108, Presented at Joint Video Exploration Team (JVET) of ITU-T SG 16 WP 3 and ISO/IEC JTC 1/SC 29/WG 1, 4th Meeting: Chengdu, CN, Oct. 15-21, 2016, 6 pages.
Narroschke et al., "Reduction of operations in the critical path of the de blocking filter," WG11 No. m18974, Document: JCTVC-D214, Joint Collaborative Team on Video Coding (JCT-VC) of ITU-T SG16 WP3 and 1S0/IEC JTC1/SC29/WG11, Daegu, KR, dated Jan. 20-28, 2011, 15 pages, XP030047543.
Norkin et al., "HEVC deblocking filtering and decisions," Applications of Digital Image Processing XXXV, edited by Andrew G. Tescher, Proc. of SPIE vol. 8499, 849912, 8 pages, XP055560803.
Norkin, A., Andersson, K., Fuldseth, A. and Bjontegaard, G., Oct. 2012, HEVC deblocking filtering and decisions. In Applications of Digital Image Processing XXXV (vol. 8499, p. 849912). International Society for Optics and Photonics (Norkin).
Office Action in Japanese Appln. No. 2019-510414, dated Oct. 26, 2021, 12 pages (with English translation).
Wiegand et al., "WD1: Working Draft 1 of High-Efficiency Video Coding," JCTVC-C403, Presented at Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, 137 pages.
Wiegand et al., "Working Draft 1 of High-Efficiency Video Coding," JCTVC-C403, Joint Collaborative Team on Video Coding (JCT-VC) of ITU-T SG16 WP3 and 1S0/IEC JTC1/SC29/WG11, Guangzhou, CN, dated Oct. 7-15, 2010, 137 pages, XP030008032.
Chen et al., "Algorithm Description of Joint Exploration Test Model 3," JVET-C1001_v2, Presented at Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 pages.
Notice of Allowance in Korean Appln. No. 10-2019-7005634, dated May 25, 2022, 4 pages (with English translation).
Office Action in European Appln. No. 17843912.1, dated Mar. 15, 2023, 8 pages.
International Telecommunication Union, "High efficiency video coding," Series H: Audiovisual and Multimedia Systems; Infrastructure of audiovisual services—Coding of moving video, Recommendation ITU-T H.265, Apr. 2015, 634 pages.

* cited by examiner

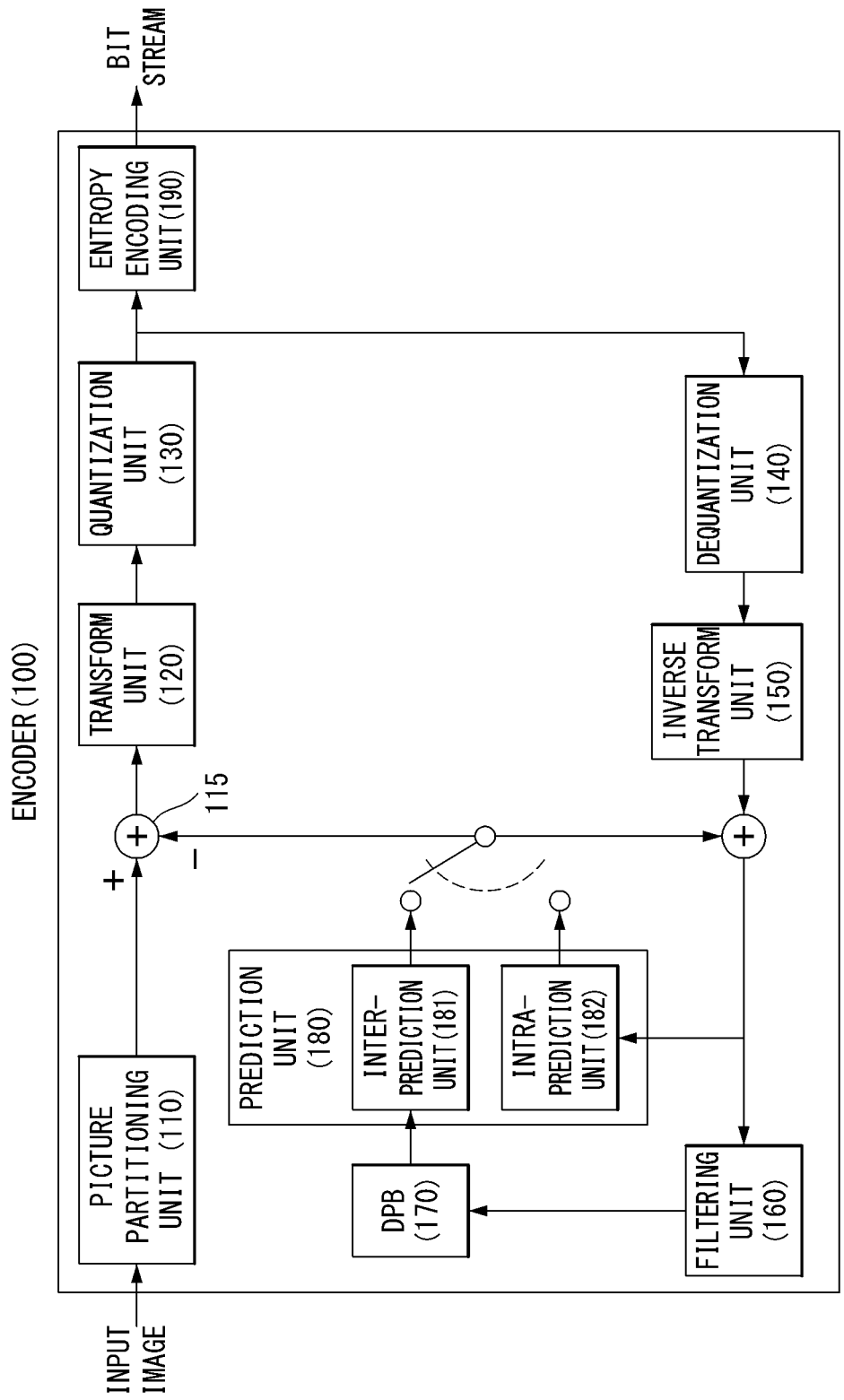
[Fig. 1]

[Fig. 2]
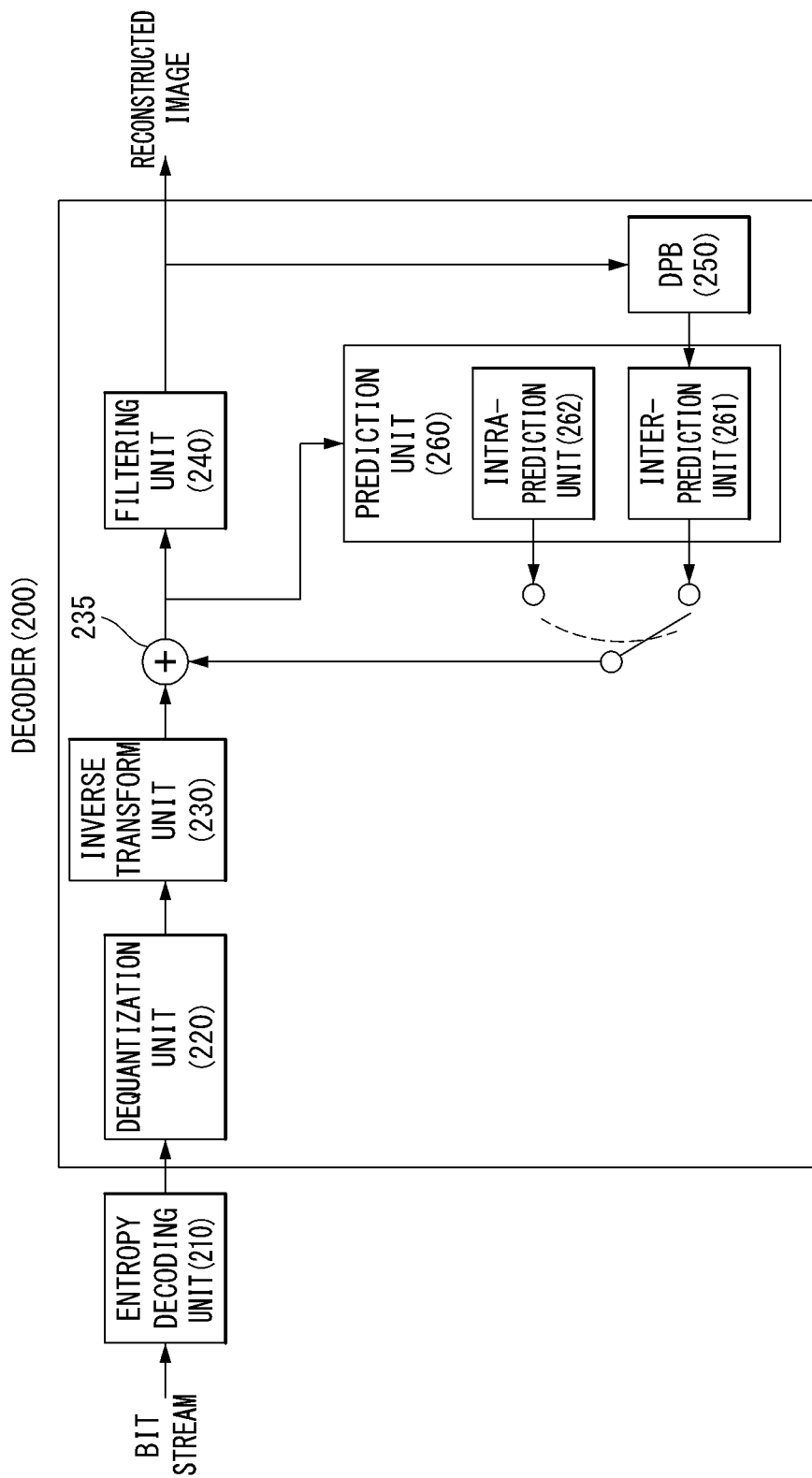

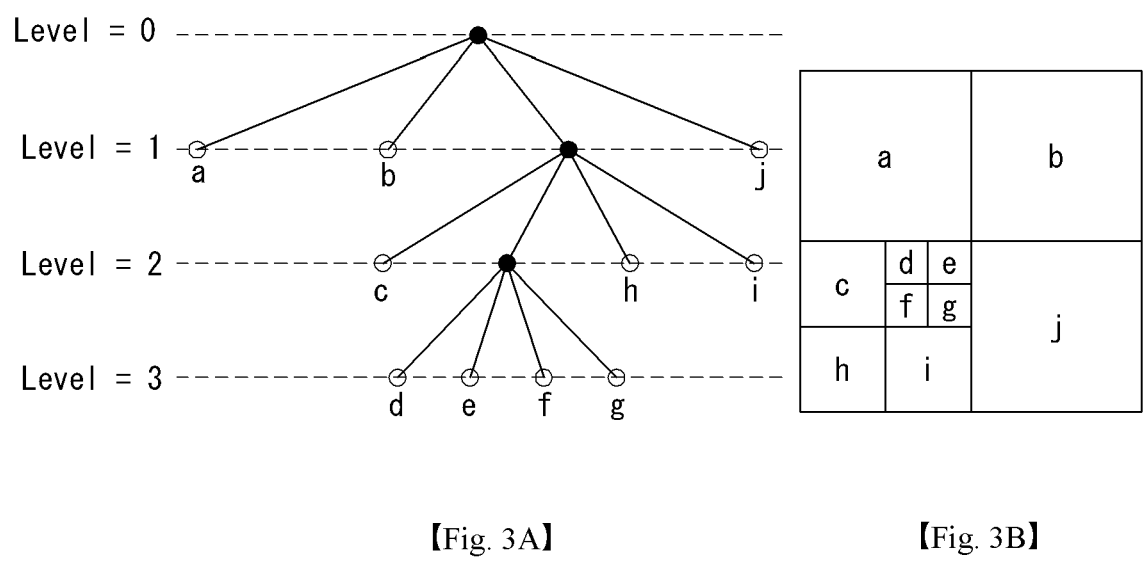
[Fig. 3A]   [Fig. 3B]

[Fig. 4]
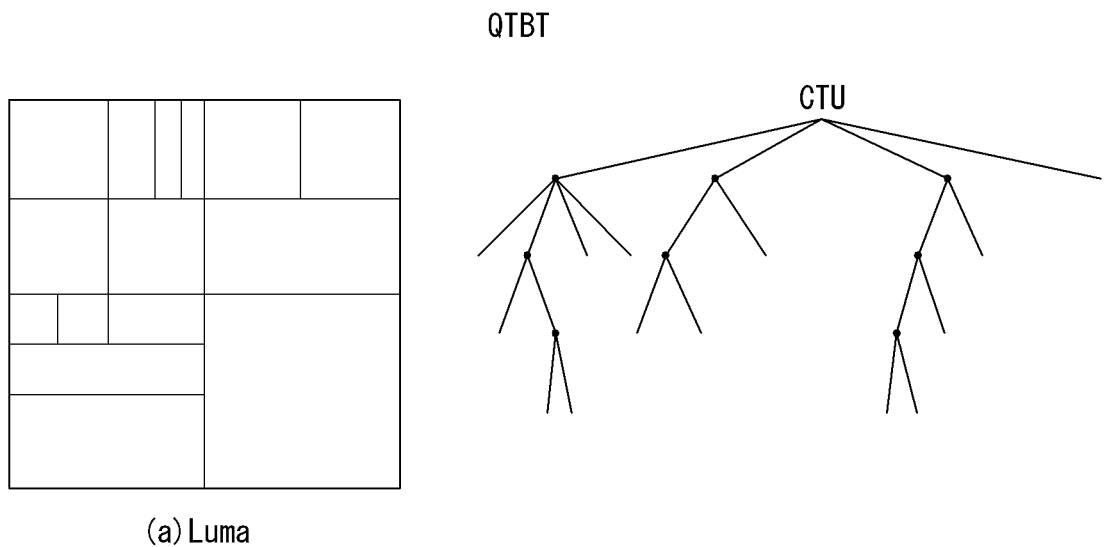
(a) Luma
[Fig. 5]
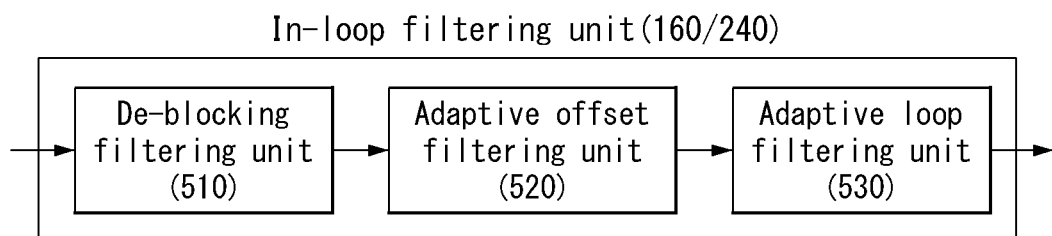

[Fig. 6]
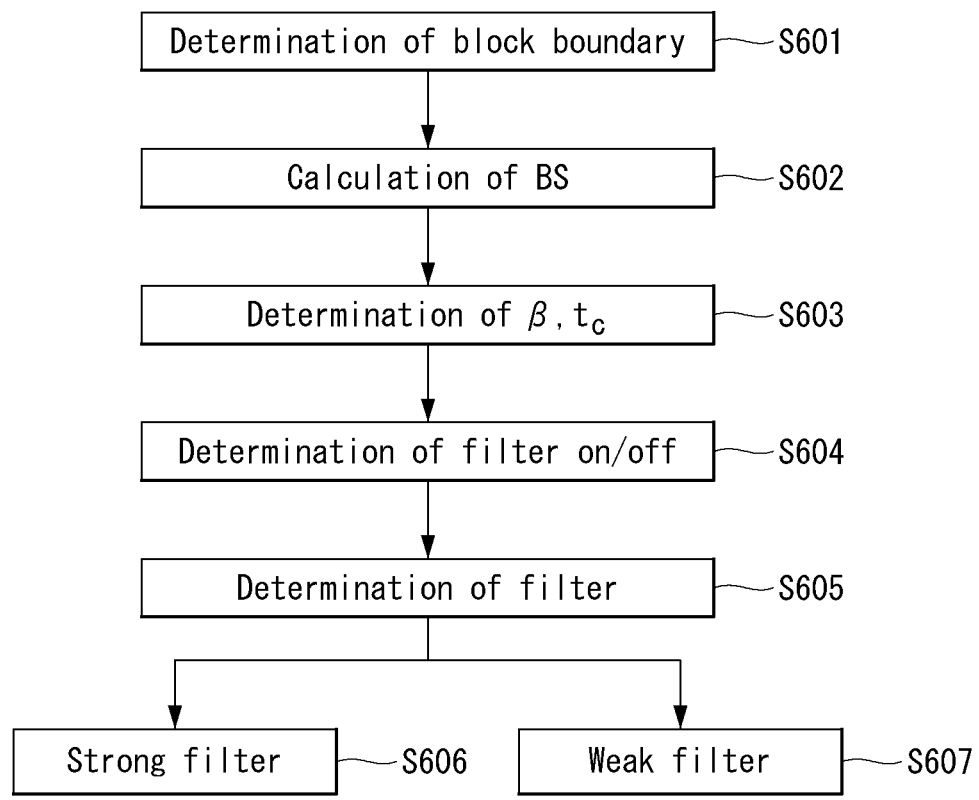

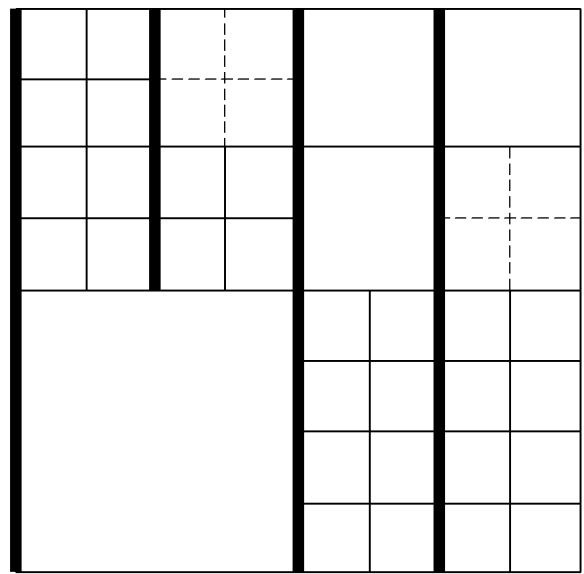
[Fig. 7A]
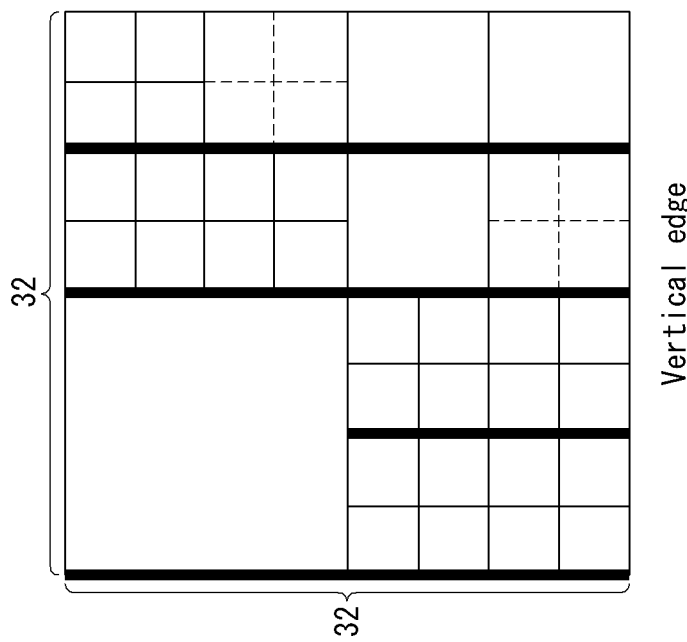
[Fig. 7B]

[Fig. 8]
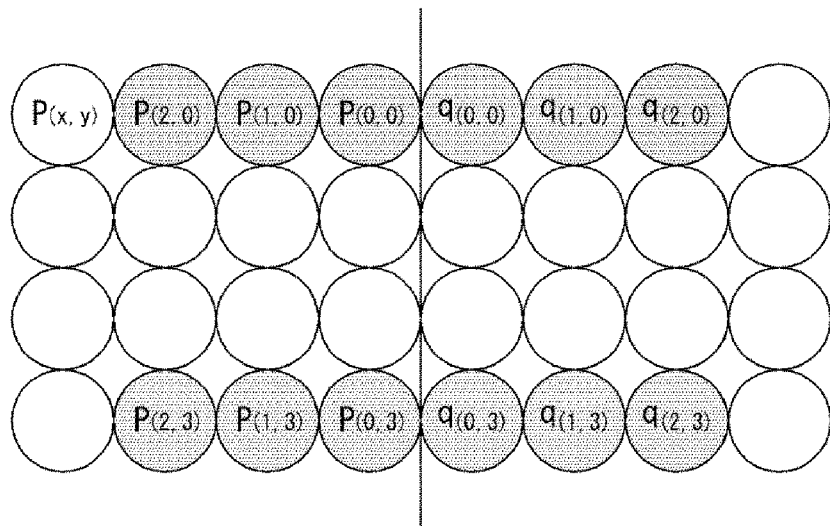
[Fig. 9A]
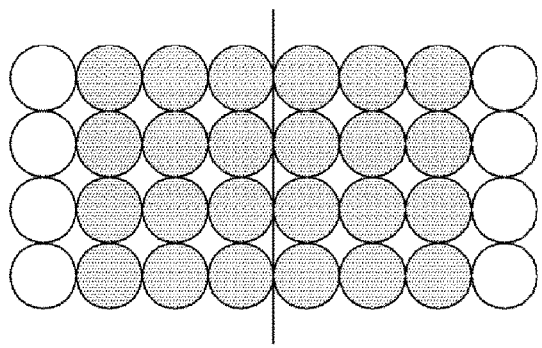
Pixels filtered by
a strong filter
[Fig. 9B]
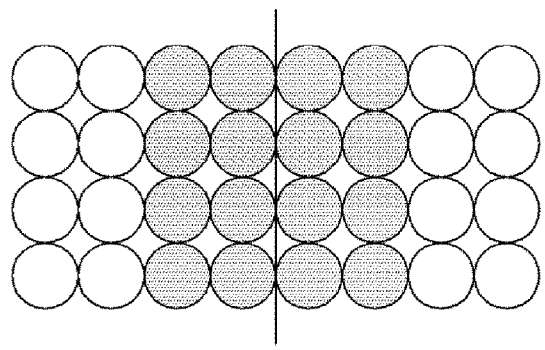
Pixels filtered by
a weak filter

[Fig. 10A]
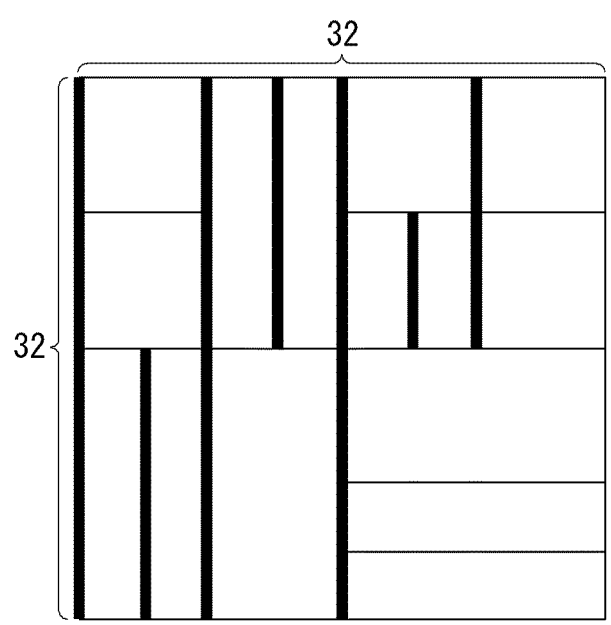
Vertical edge
[Fig. 10B]
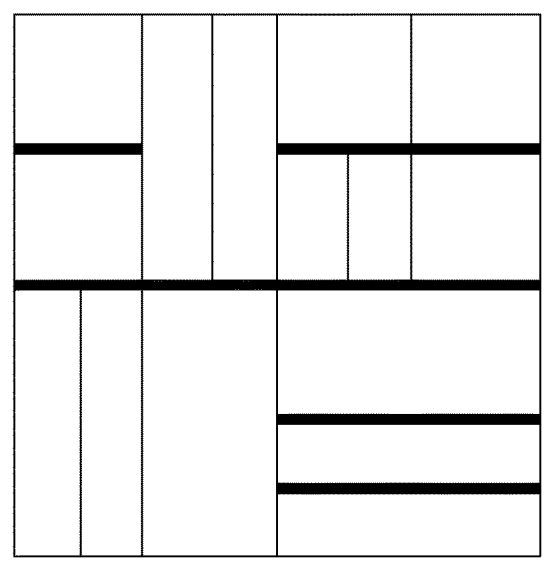
Horizontal edge

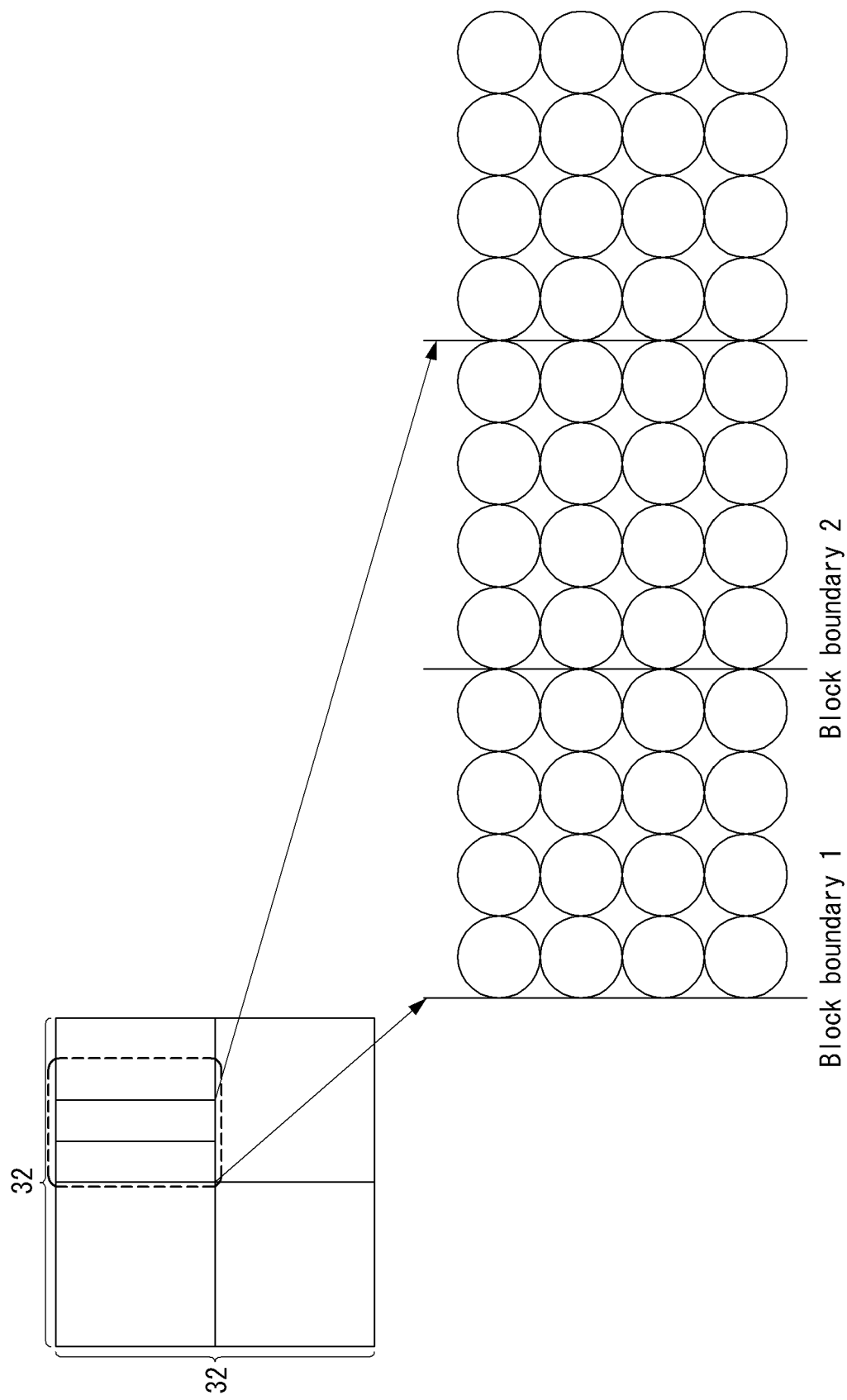
[Fig. 11]

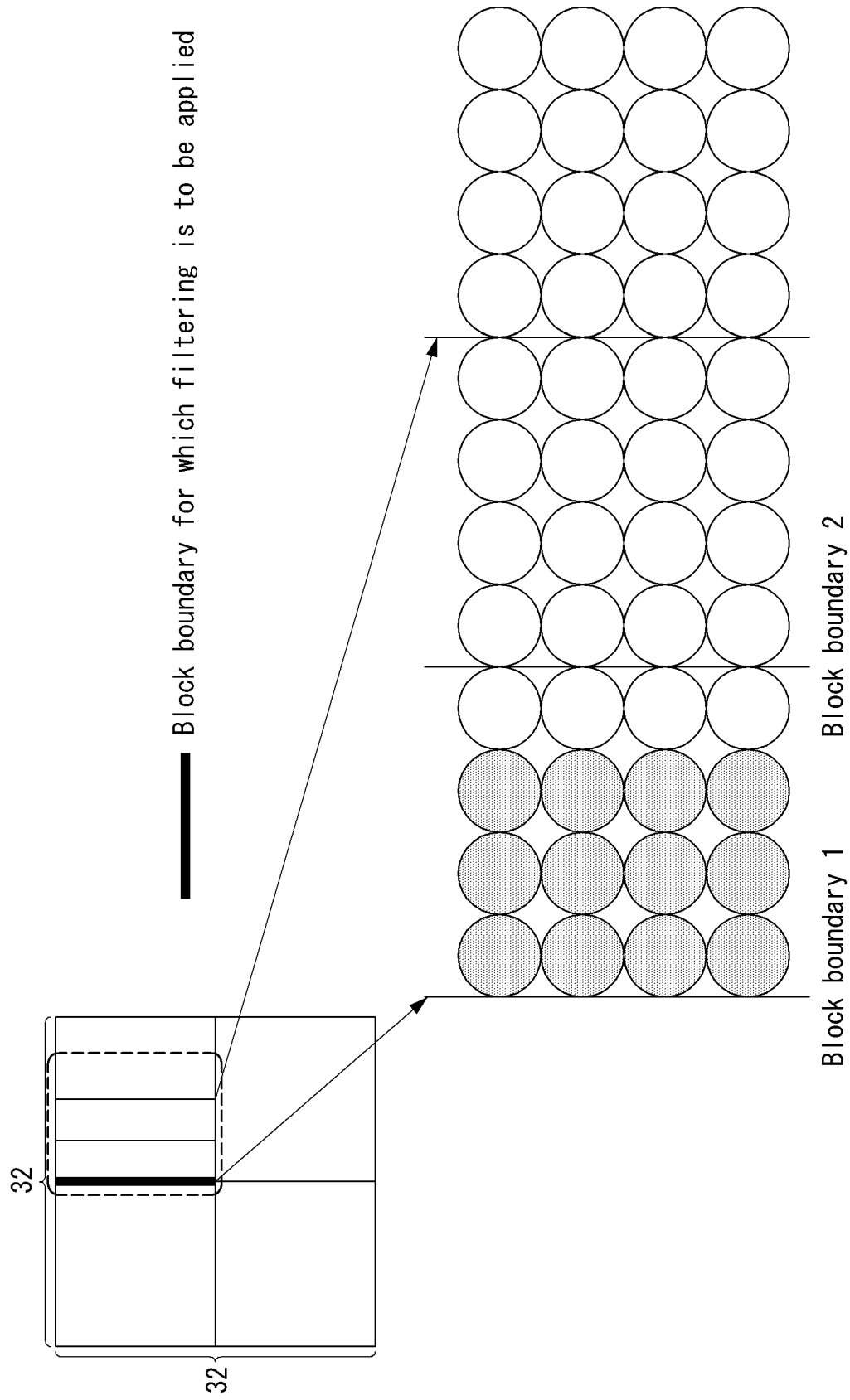

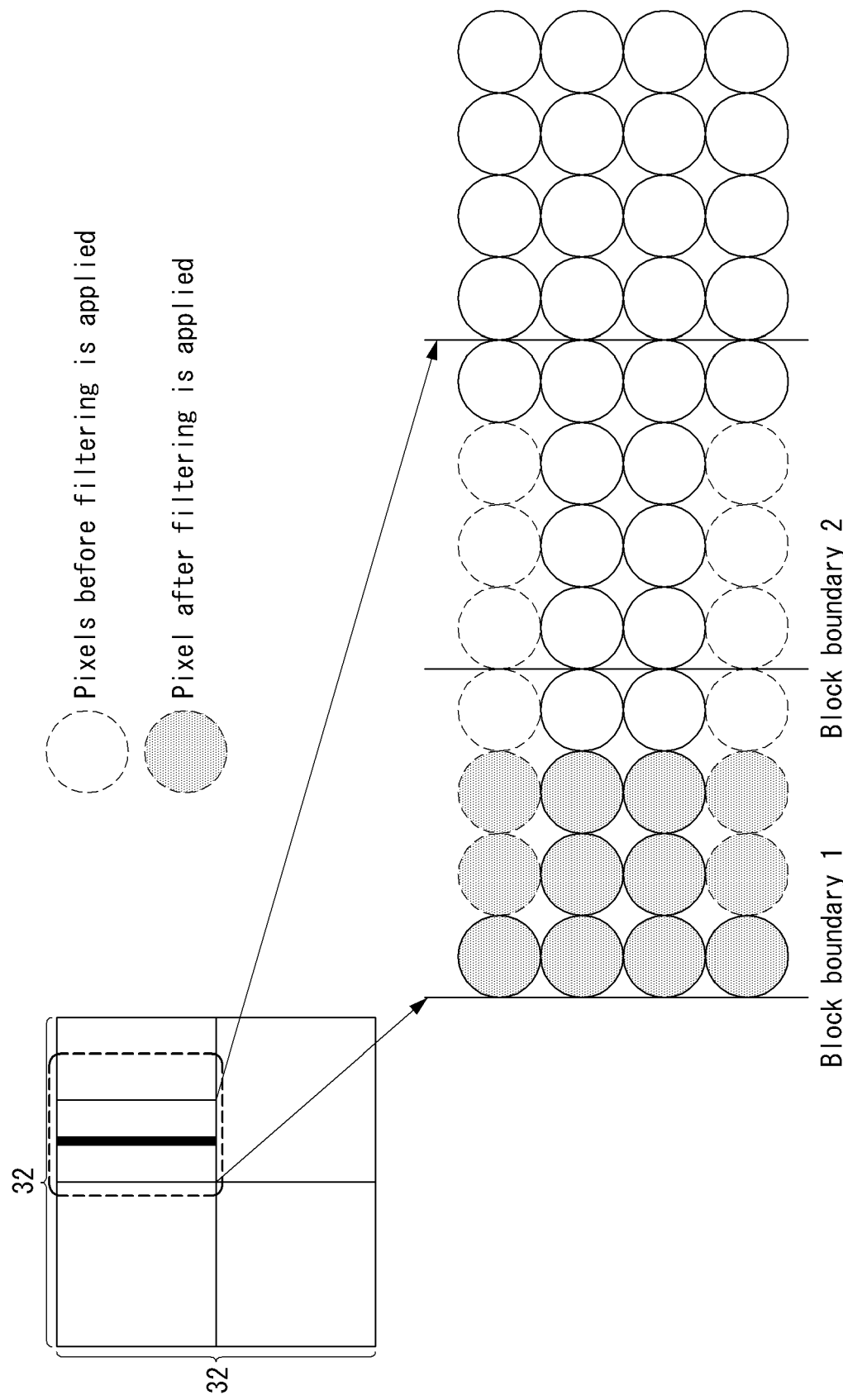
[Fig. 13]

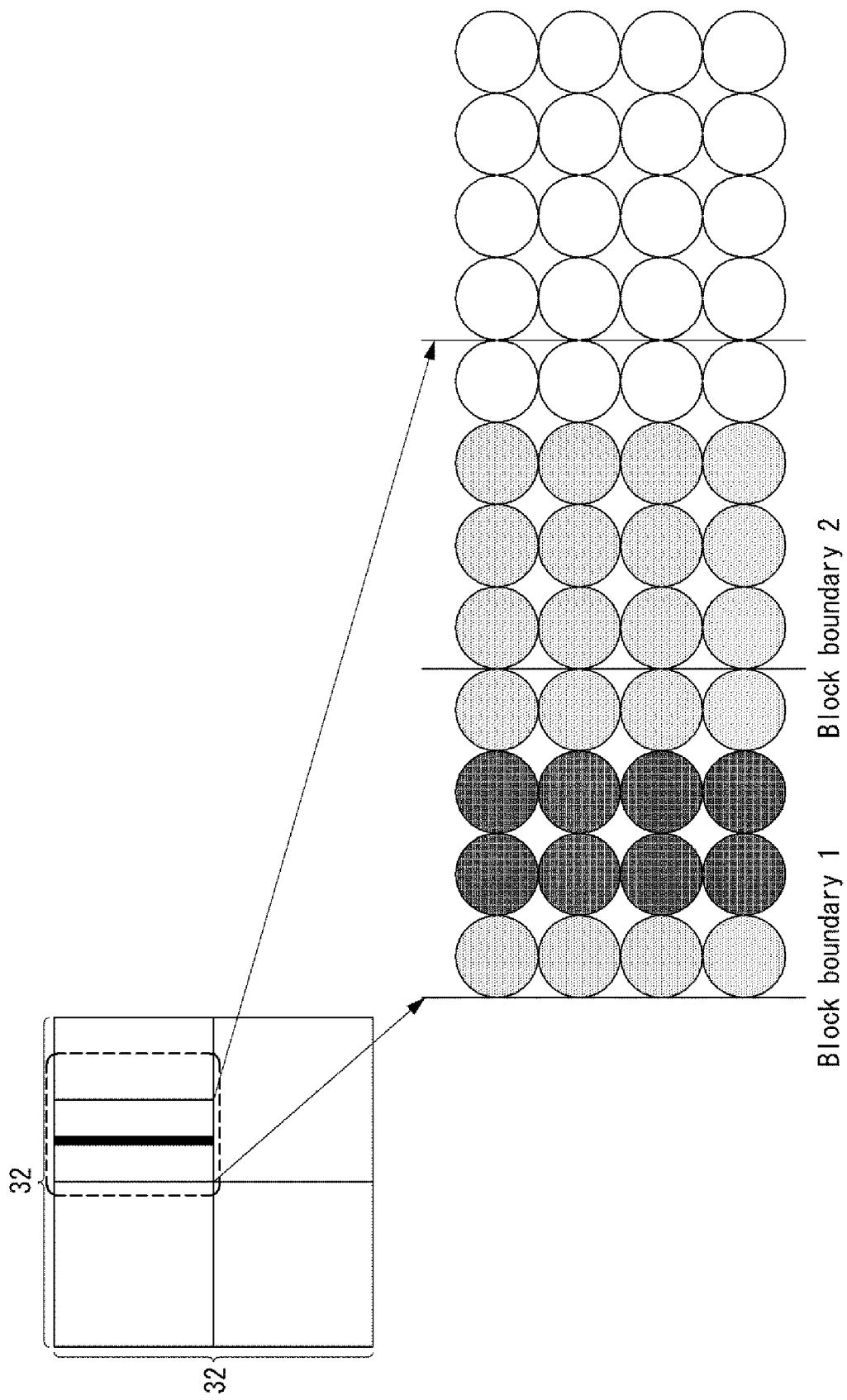
[Fig. 14]

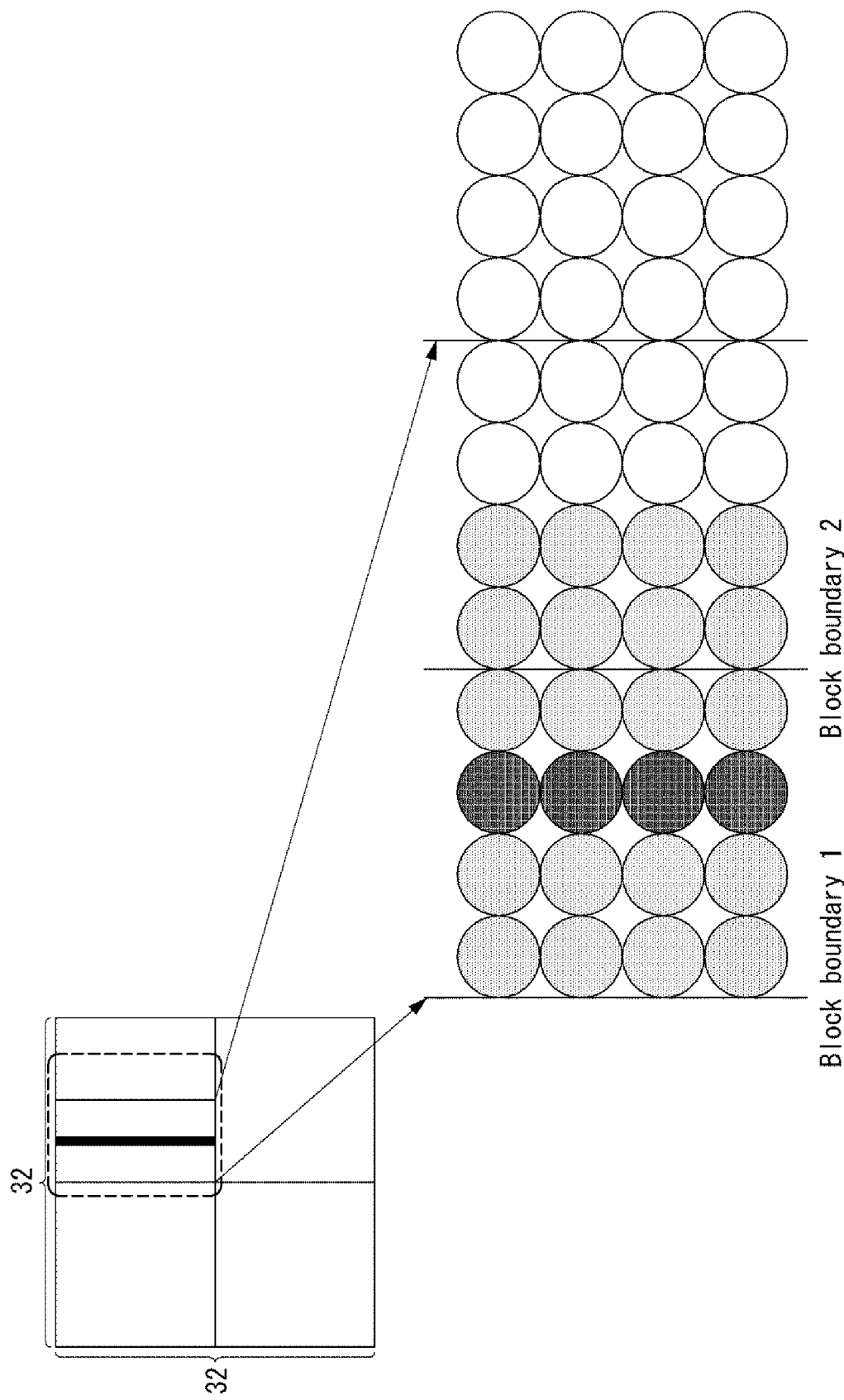
[Fig. 15]

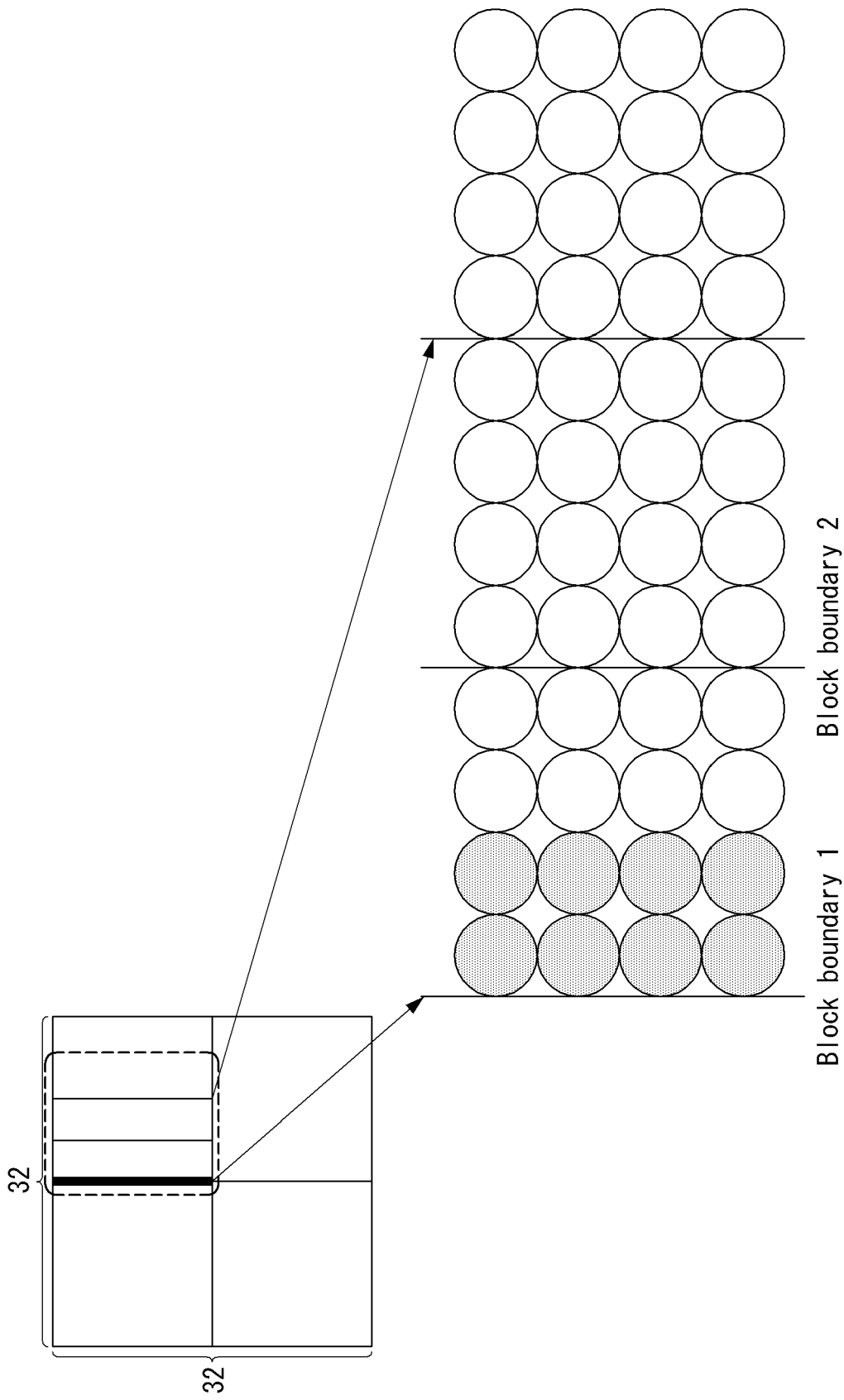
[Fig. 16]

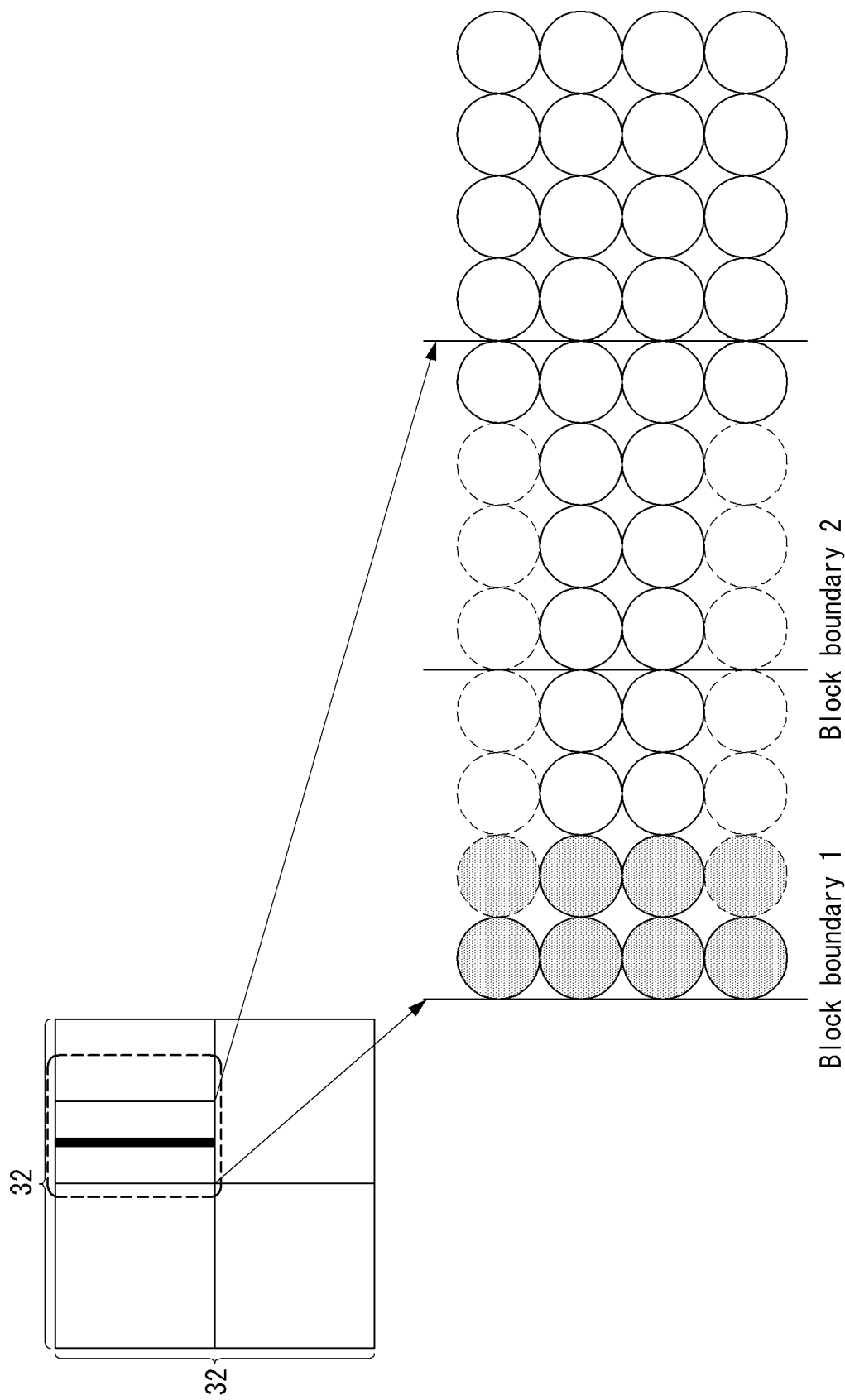
[Fig. 17]

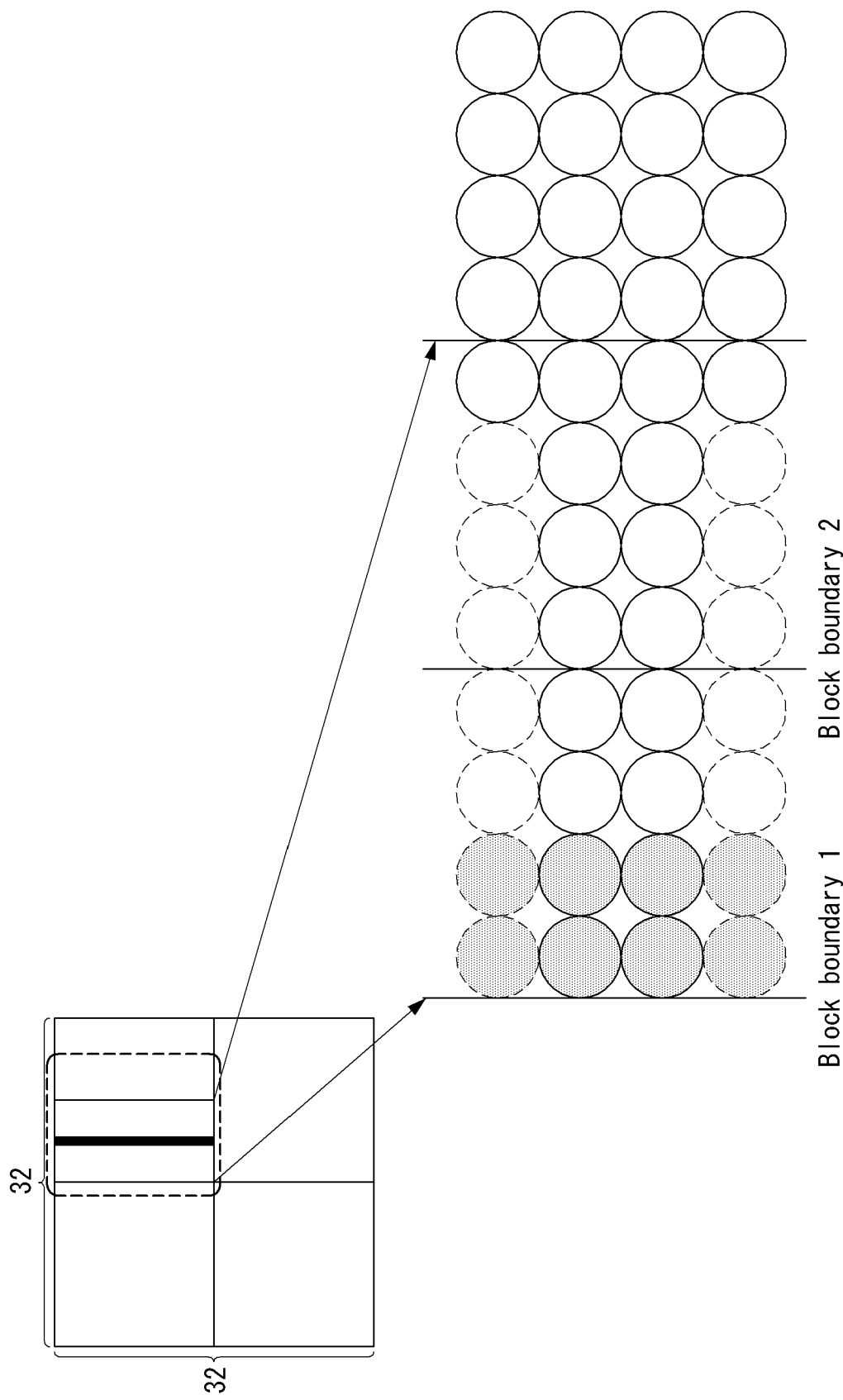
[Fig. 18]

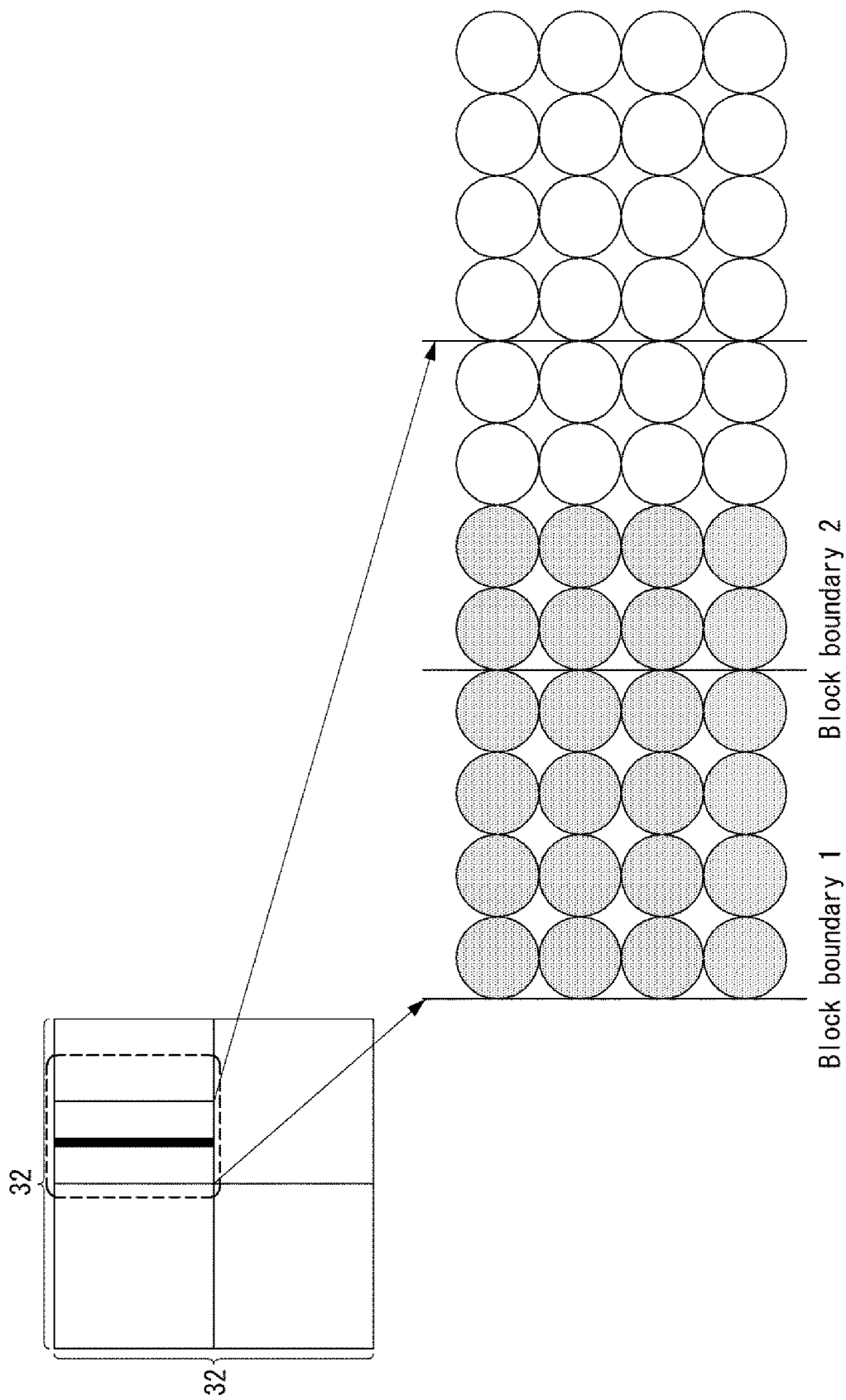
[Fig. 19]

[Fig. 20]
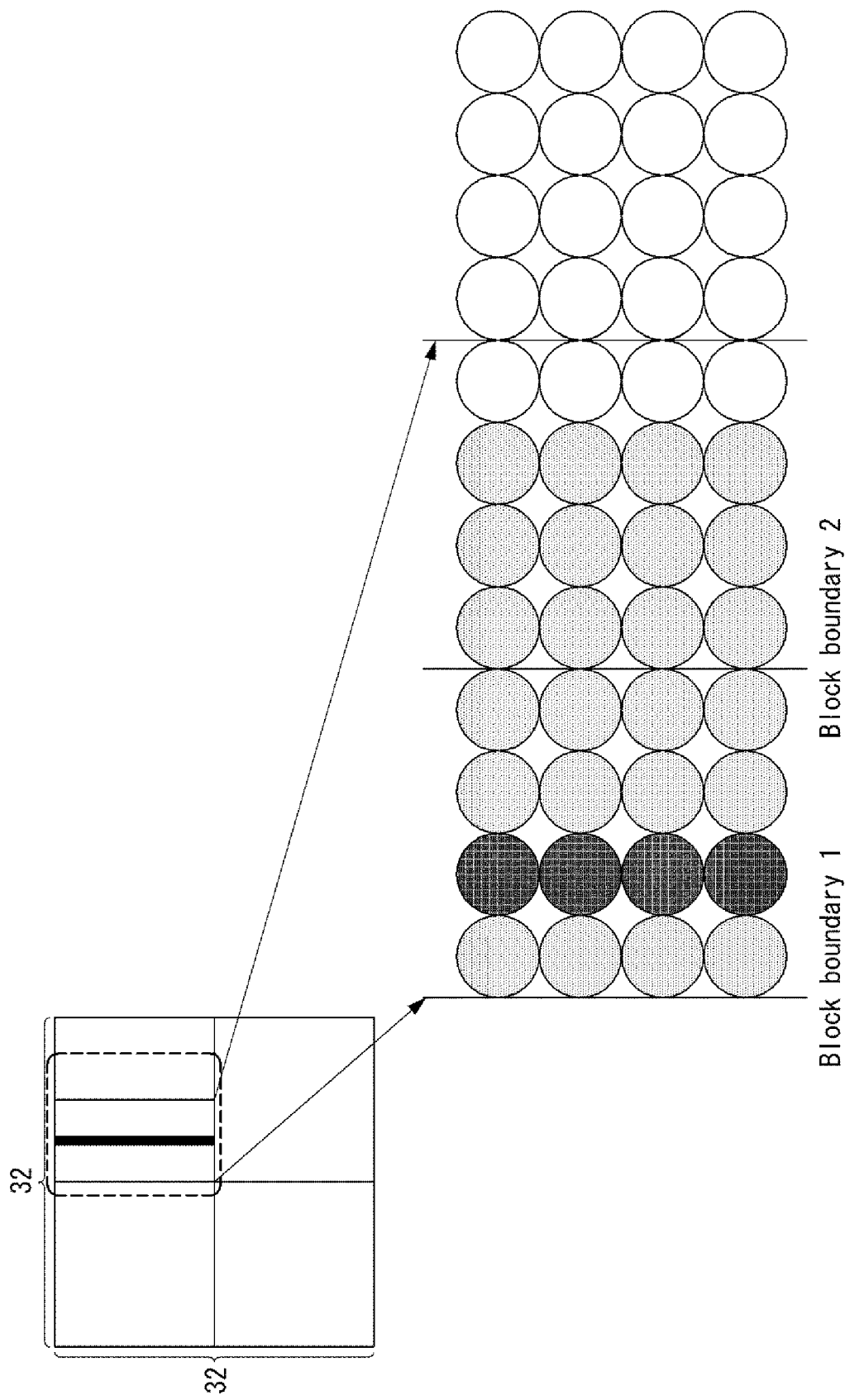

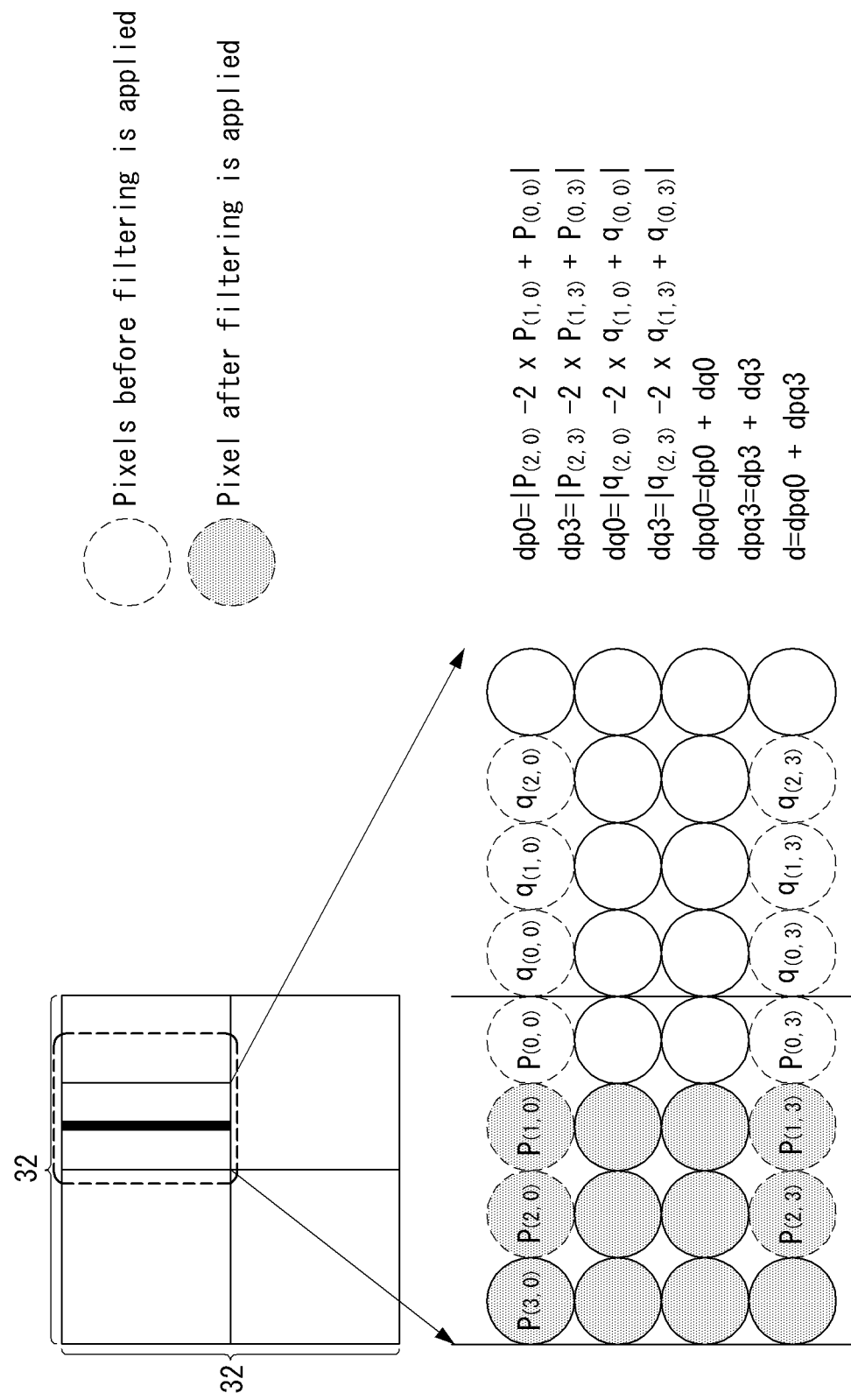

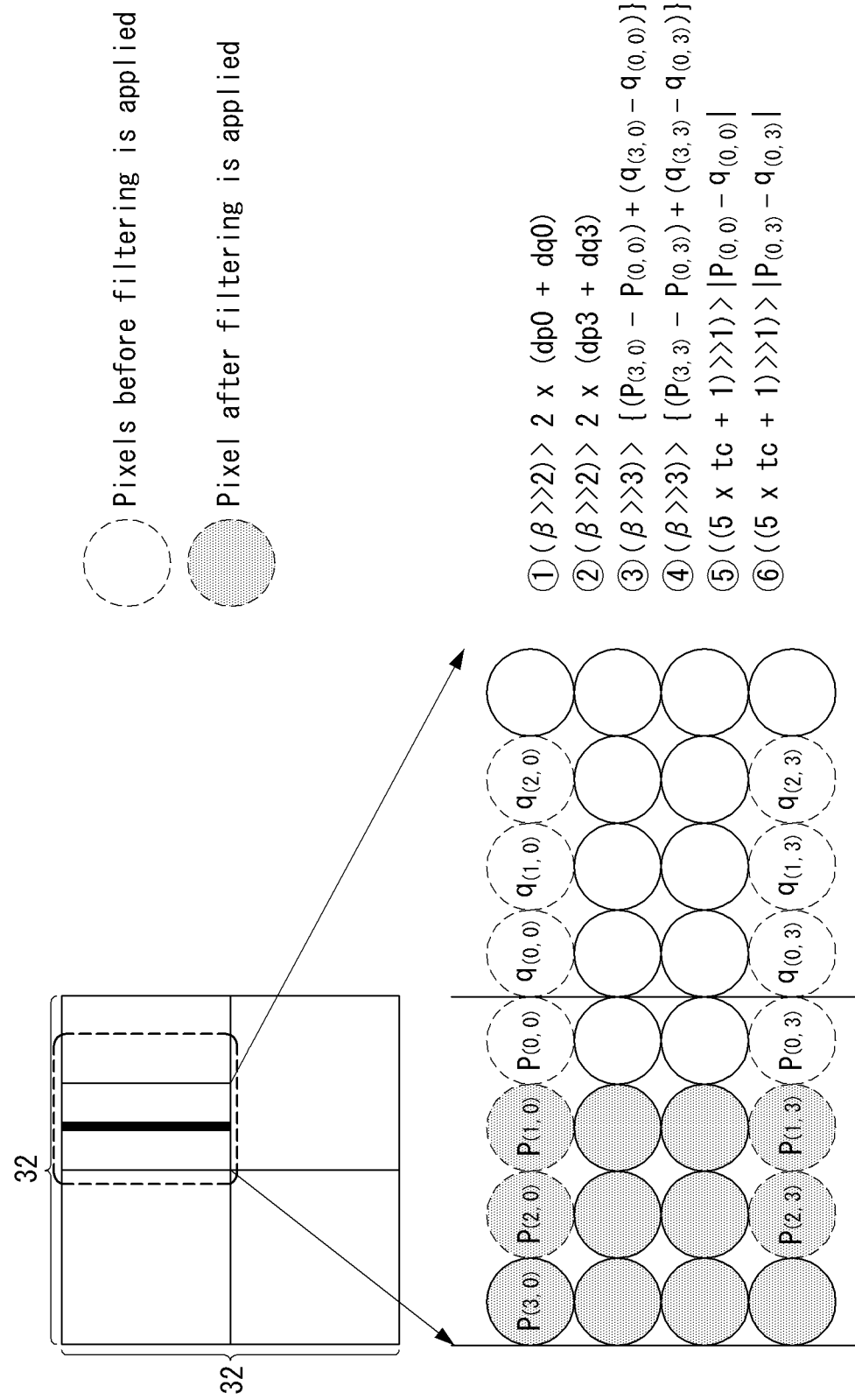
[Fig. 22]

[Fig. 23]
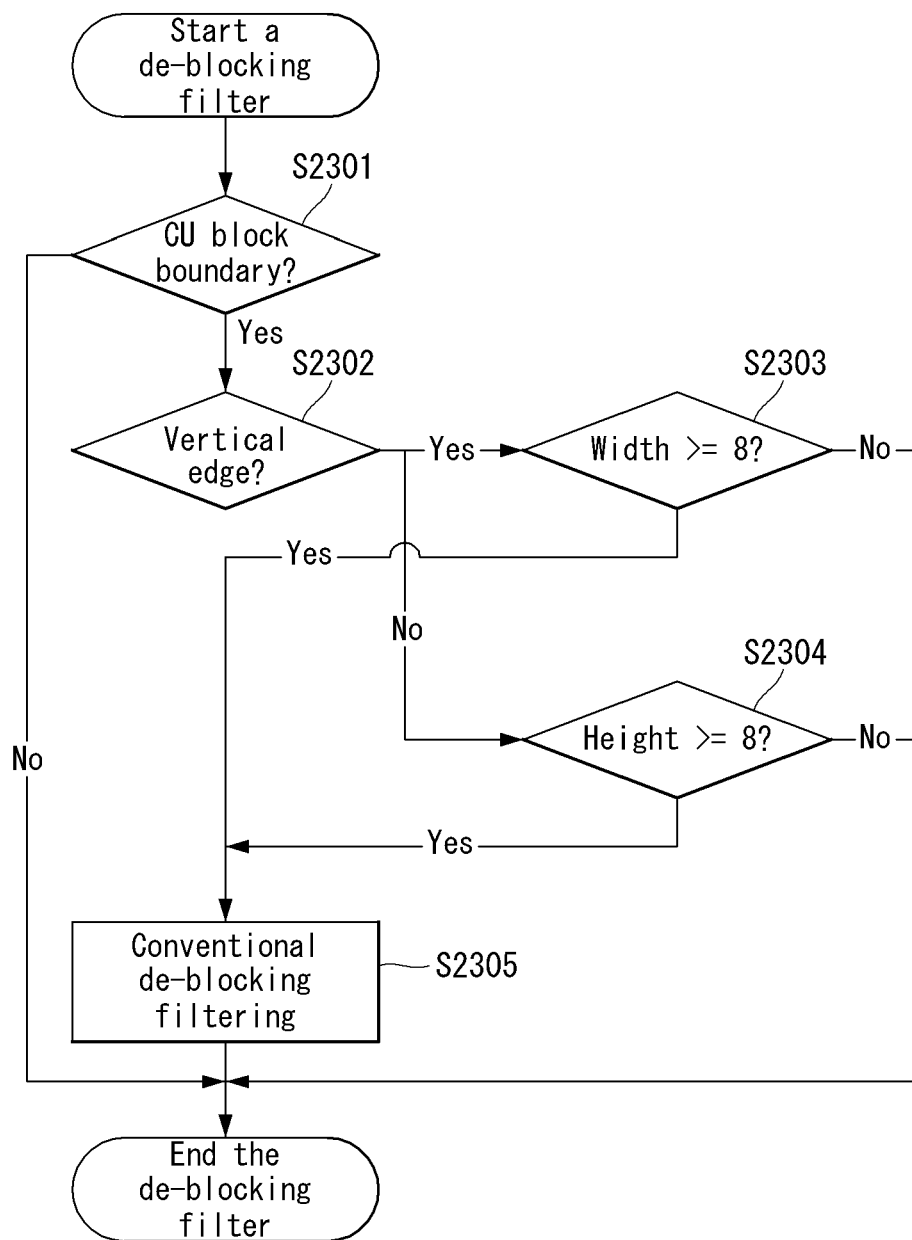

[Fig. 24]
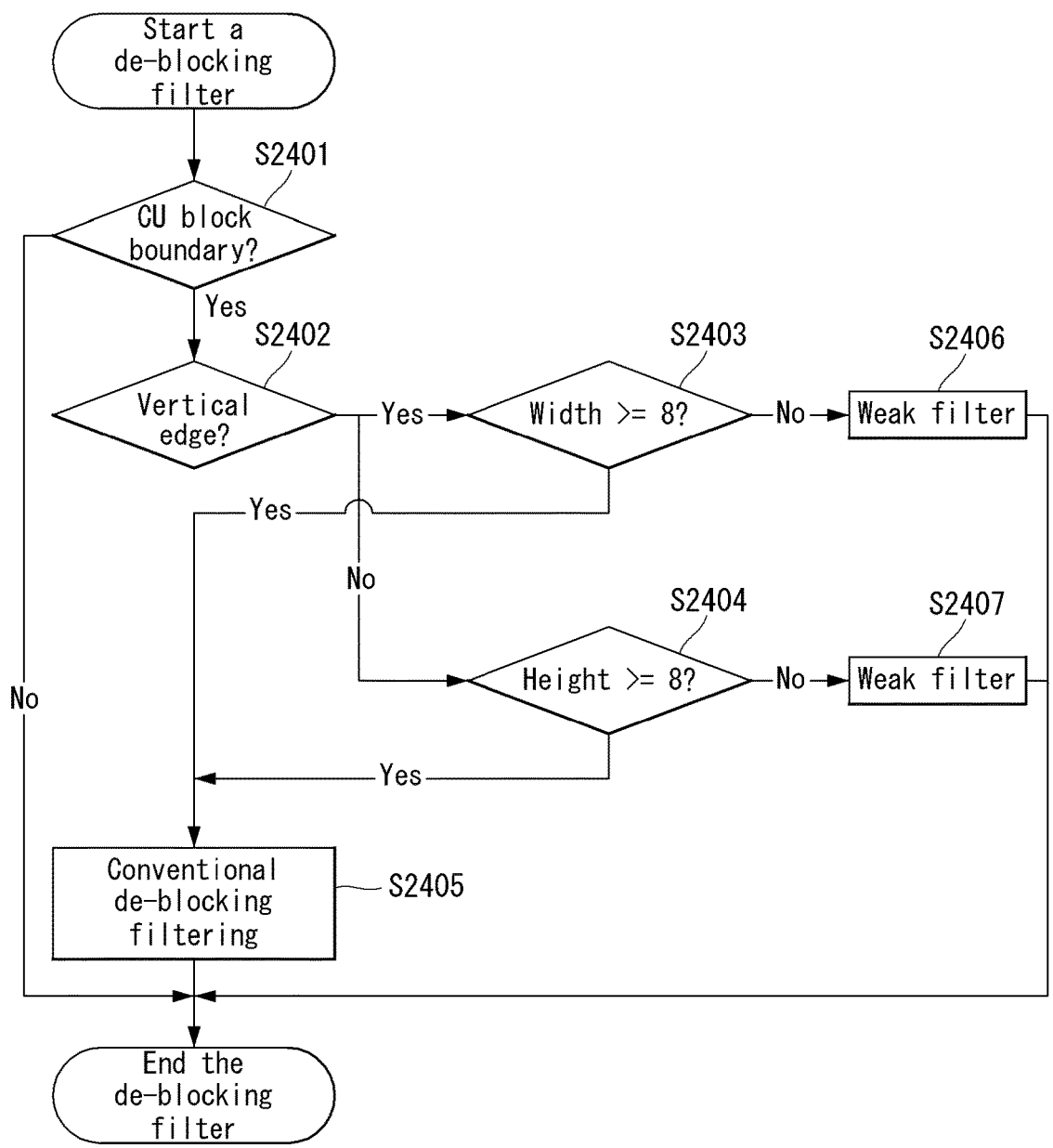

[Fig. 25]
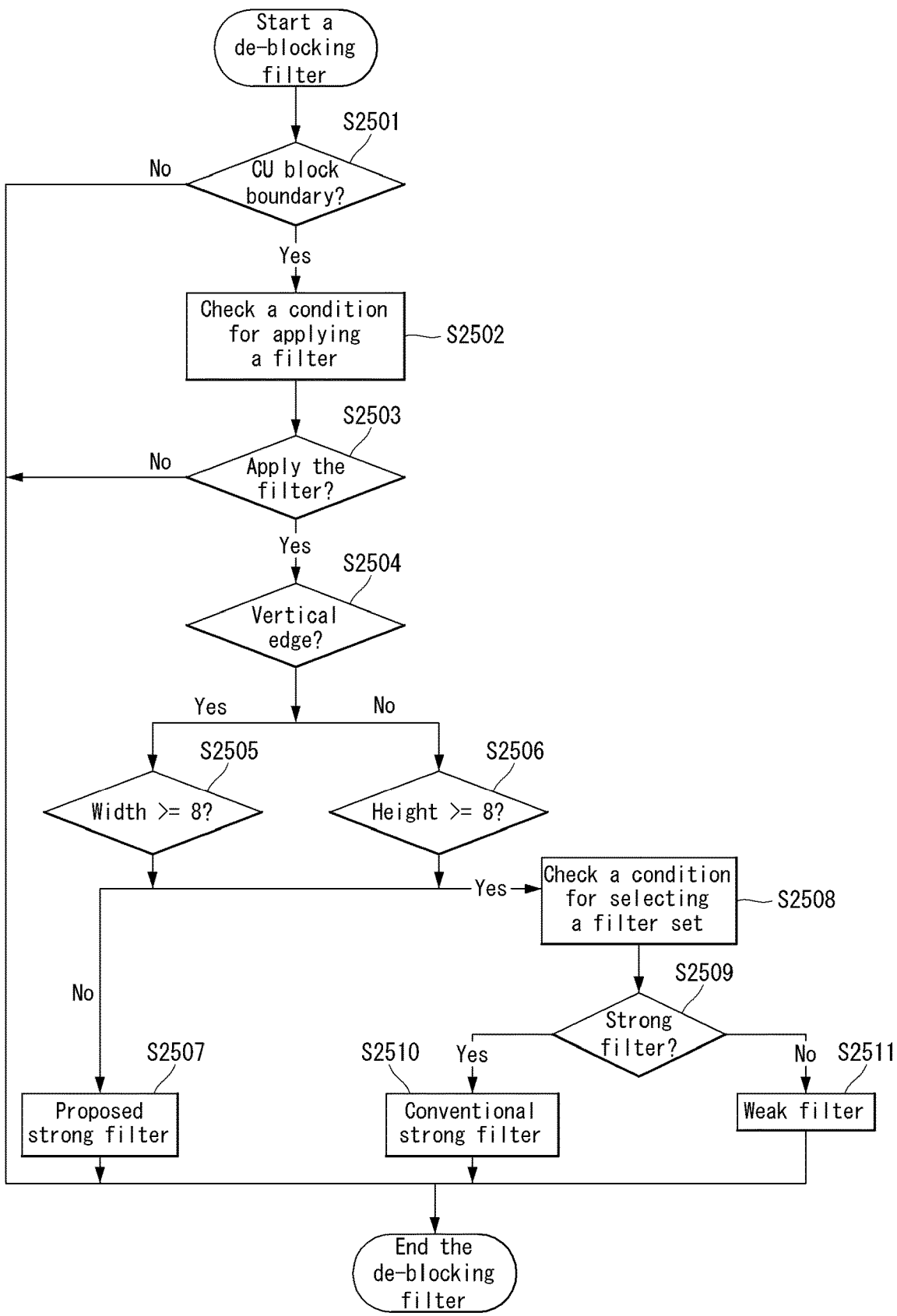

[Fig. 26]
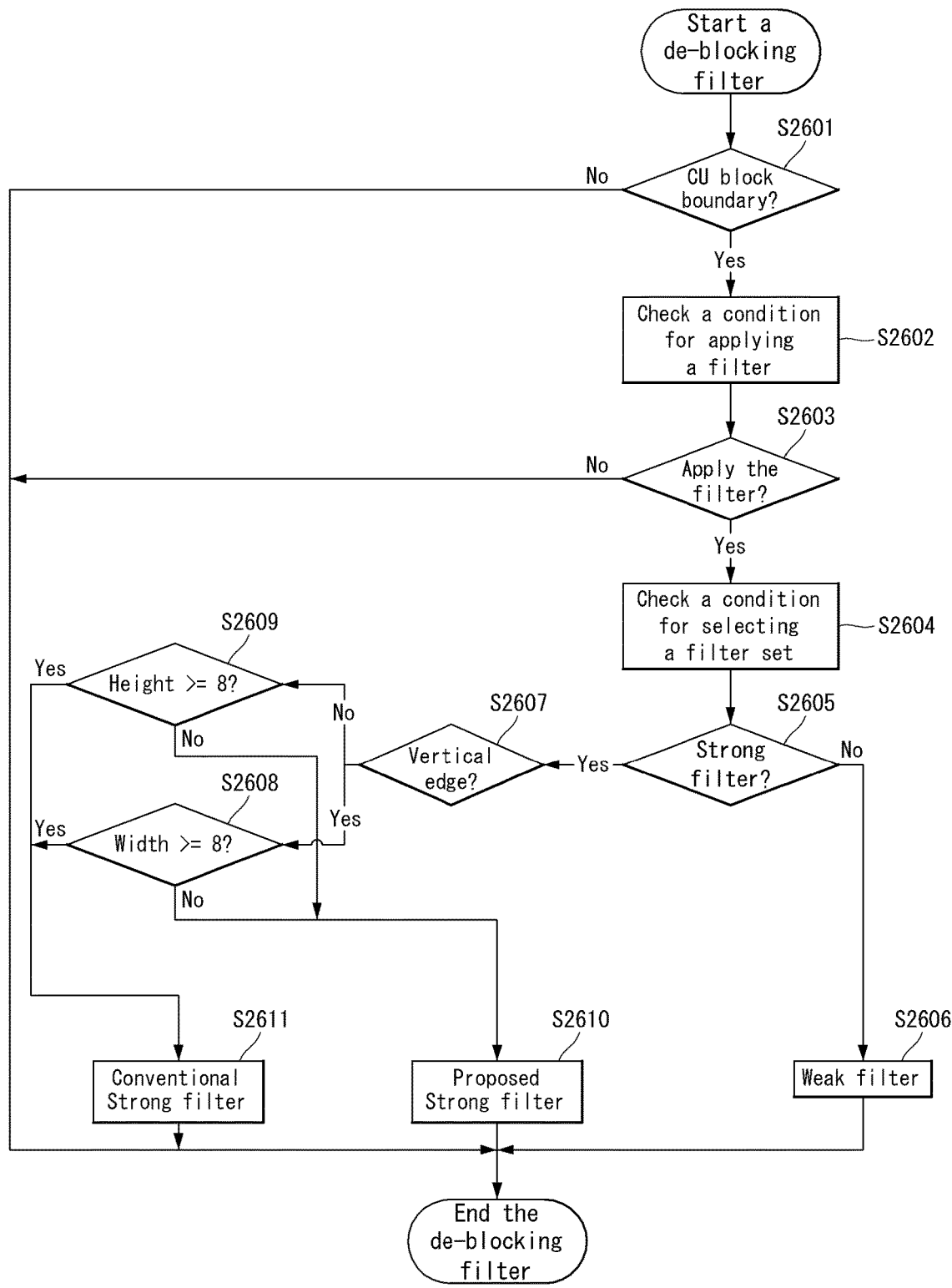

$P'_{(0,0)} = \text{Clip3}(p0 - 2 \times tc, p0 + 2 \times tc, (p2 + 2 \times p1 + 2 \times p0 + 2 \times q0 + q1 + 4) >> 3)$
$Q'_{(0,0)} = \text{Clip3}(q0 - 2 \times tc, q0 + 2 \times tc, (q2 + 2 \times q1 + 2 \times q0 + 2 \times p0 + p1 + 4) >> 3)$
$P'_{(1,0)} = \text{Clip3}(p1 - 2 \times tc, p1 + 2 \times tc, (p2 + p1 + p0 + q0 + 2) >> 2)$
$Q'_{(1,0)} = \text{Clip3}(q1 - 2 \times tc, q1 + 2 \times tc, (q2 + q1 + q0 + p0 + 2) >> 2)$
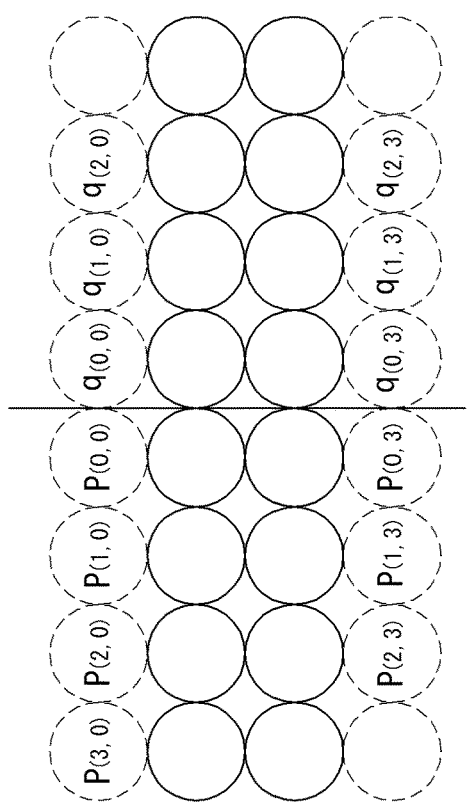
[Fig. 27A] Before filtering
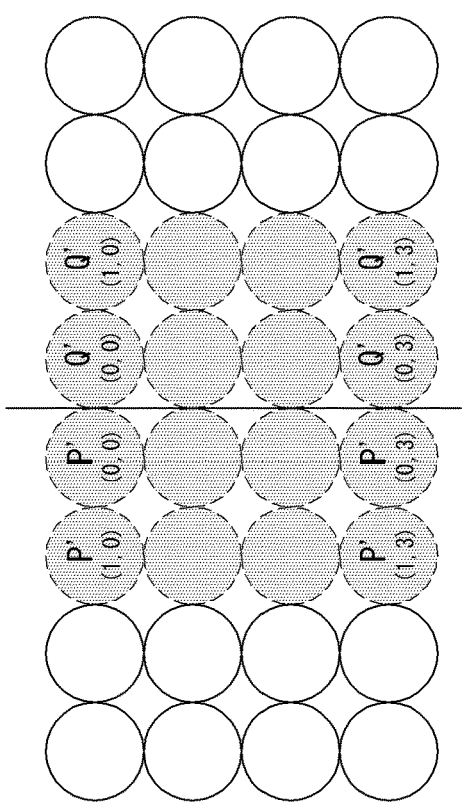
[Fig. 27B] After filtering $P'_{(0,0)} = \text{Clip3}(p0 - 2 \times tc, p0 + 2 \times tc, (p2 + p1 + 2 \times p0 + q0 + 2) >> 2)$
$Q'_{(0,0)} = \text{Clip3}(q0 - 2 \times tc, q0 + 2 \times tc, (q1 + 2 \times q0 + p0 + 2) >> 2)$
$P'_{(1,0)} = \text{Clip3}(p1 - 2 \times tc, p1 + 2 \times tc, (p2 + 2 \times p1 + p0 + 2) >> 2)$
$Q'_{(1,0)} = \text{Clip3}(q1 - 2 \times tc, q1 + 2 \times tc, (q2 + 2 \times q1 + q0 + 2) >> 2)$
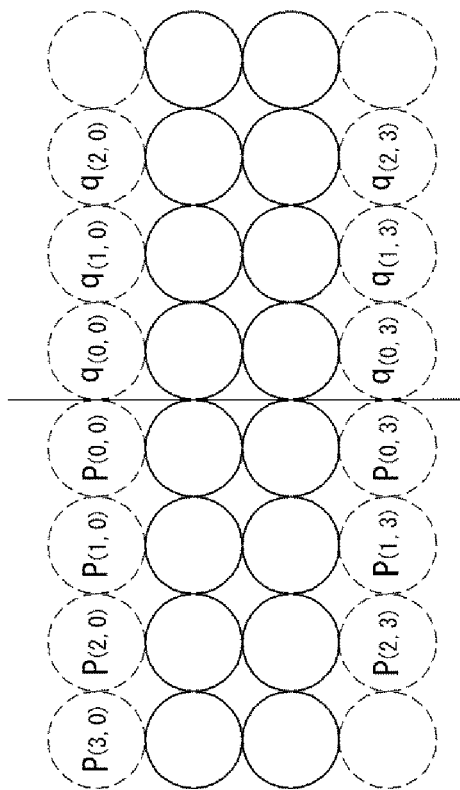
[Fig. 28A] Before filtering
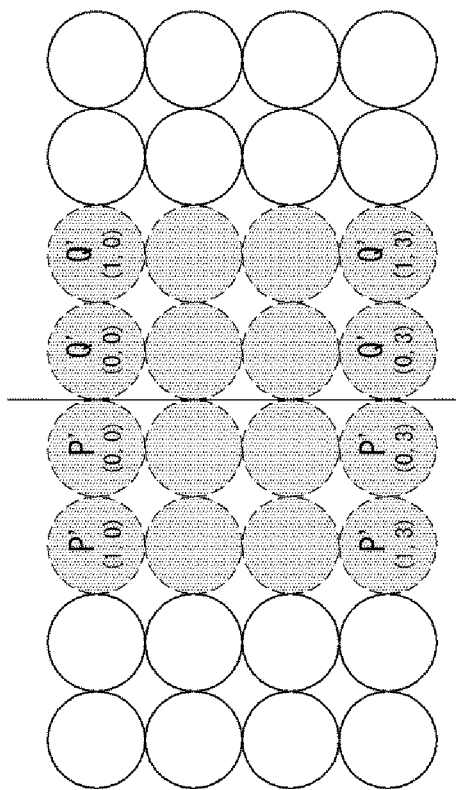
[Fig. 28B] After filtering

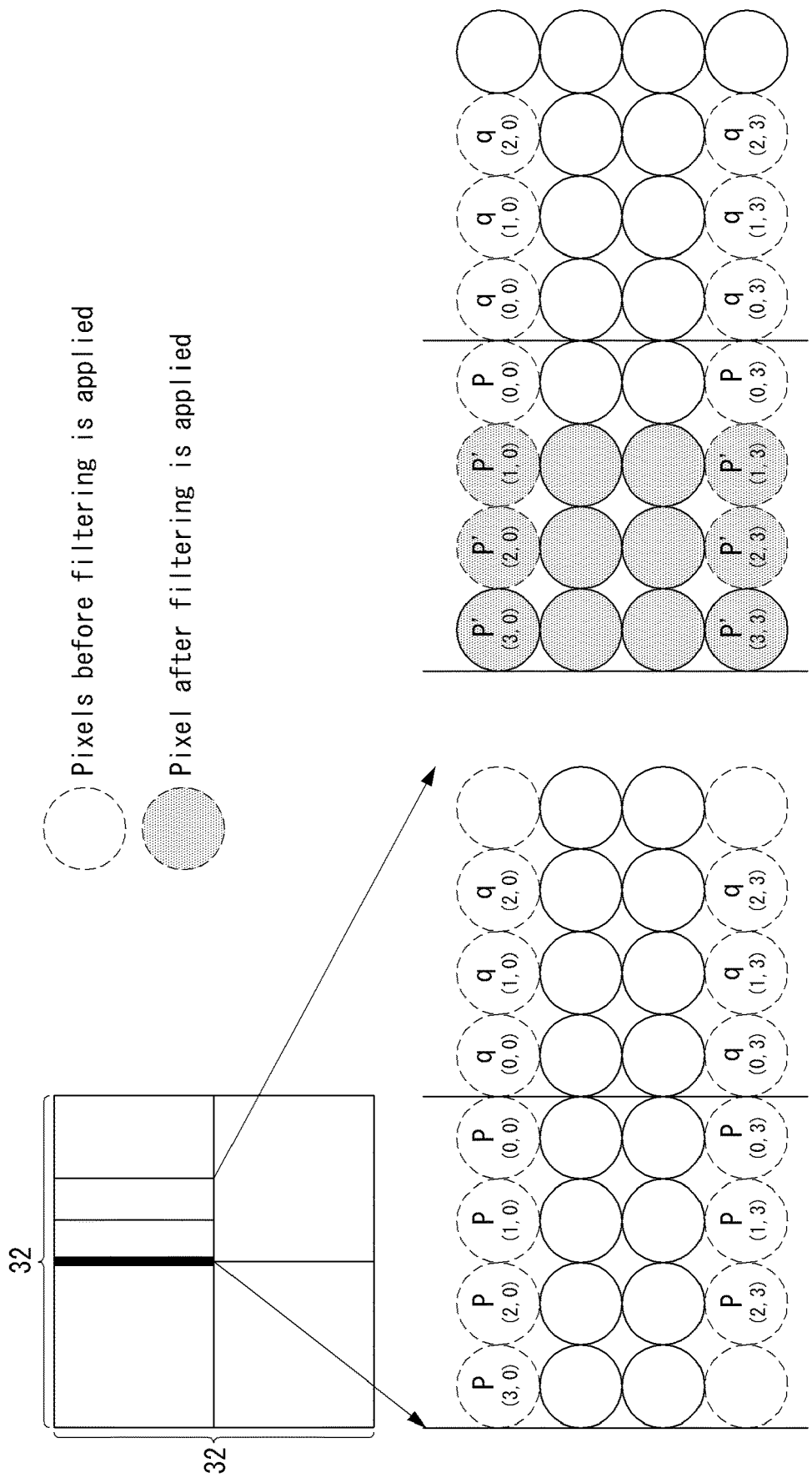

[Fig. 30B]
Pixels before filtering is applied
Pixel after filtering is applied
① $dp0 = |P_{(2,0)} - 2 \times P_{(1,0)} + P_{(0,0)}|$
② $dp3 = |P_{(2,3)} - 2 \times P_{(1,3)} + P_{(0,3)}|$
③ $dq0 = |q_{(2,0)} - 2 \times q_{(1,0)} + q_{(0,0)}|$
④ $dq3 = |q_{(2,3)} - 2 \times q_{(1,3)} + q_{(0,3)}|$
⑤ $dpq0 = dp0 + dq0$
⑥ $dpq3 = dp3 + dq3$
⑦ $d = dpq0 + dpq3$
① $(\beta \gg 2) > 2 \times (dp0 + dq0)$
② $(\beta \gg 2) > 2 \times (dp3 + dq3)$
③ $(\beta \gg 3) > \{ (P_{(3,0)} - P_{(0,0)}) + (q_{(3,0)} - q_{(0,0)}) \}$
④ $(\beta \gg 3) > \{ (P_{(3,3)} - P_{(0,3)}) + (q_{(3,3)} - q_{(0,3)}) \}$
⑤ $((5 \times tc + 1) \gg 1) > |P_{(0,0)} - q_{(0,0)}|$
⑥ $((5 \times tc + 1) \gg 1) > |P_{(0,3)} - q_{(0,3)}|$
[Fig. 30C]
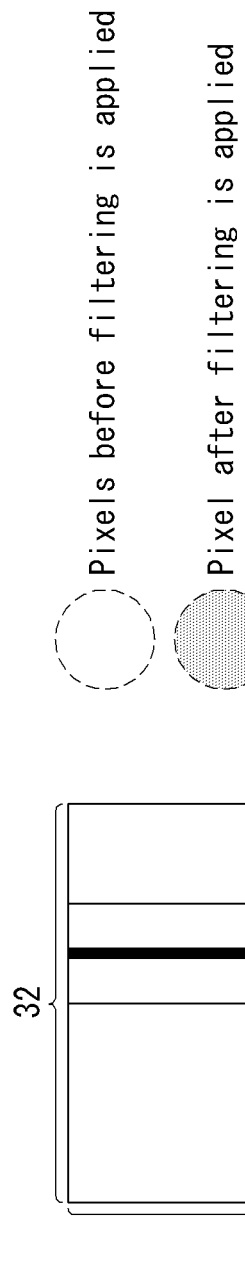
[Fig. 30A]
Before filtering

[Fig. 31]
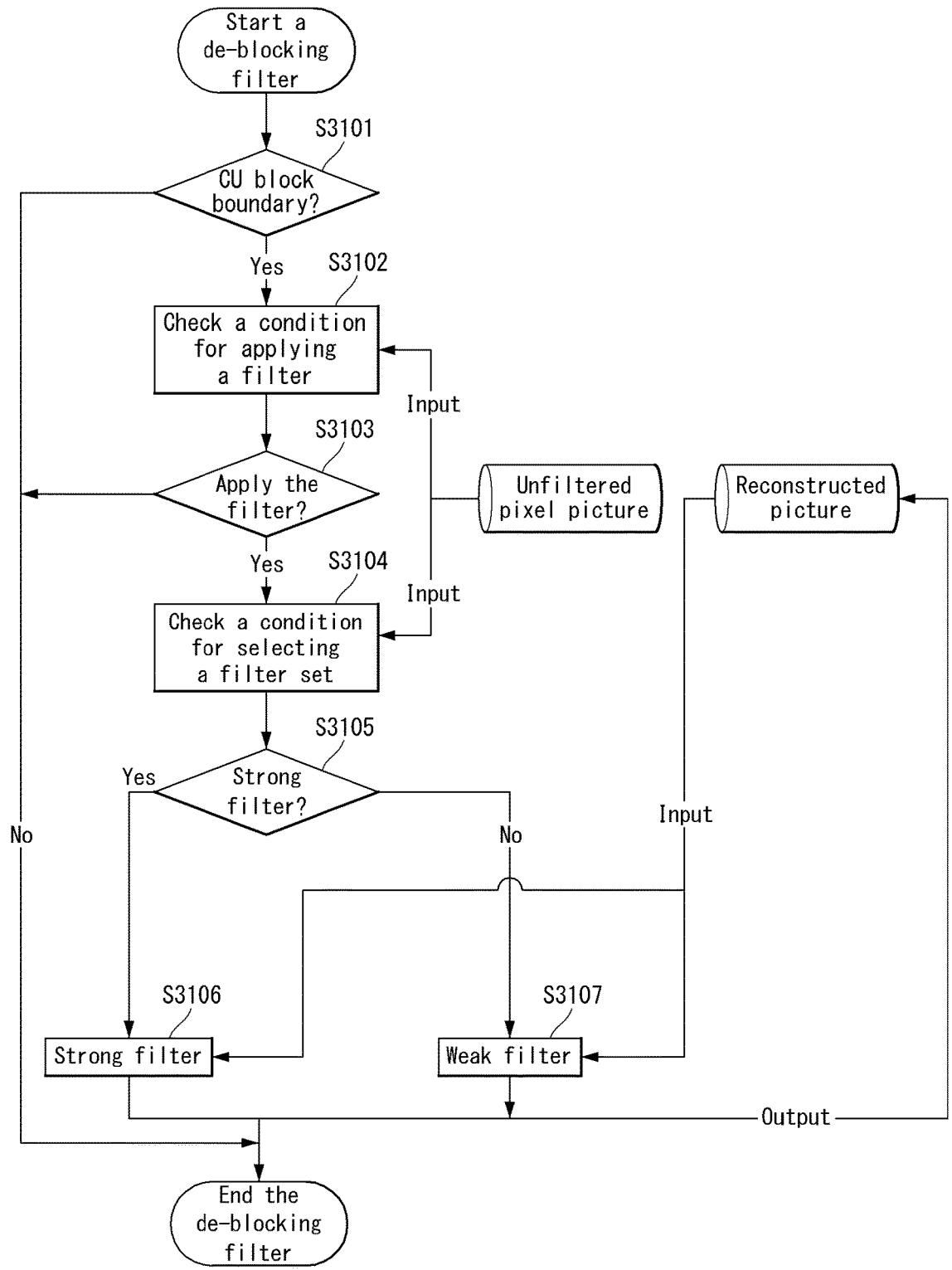

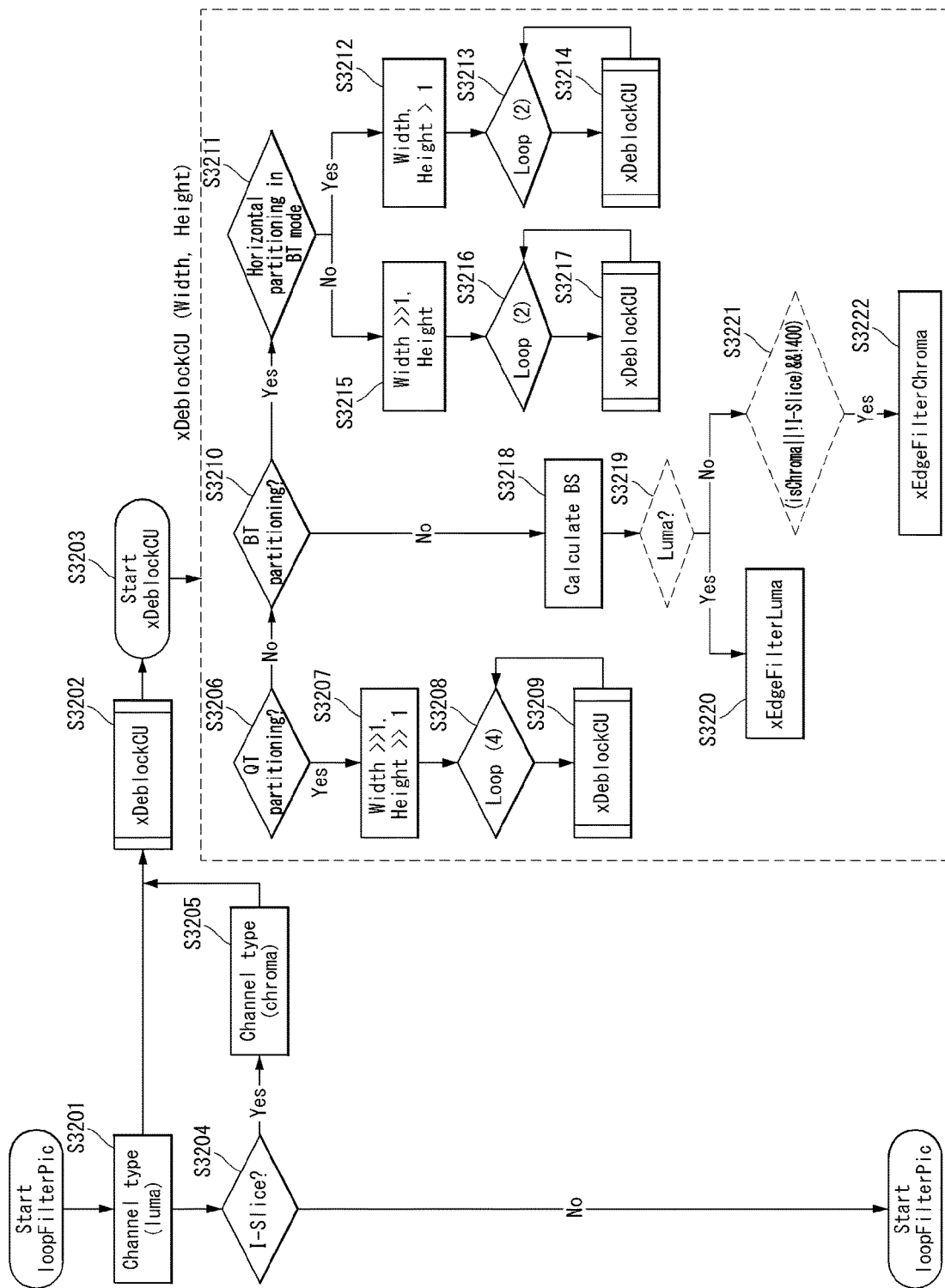
[Fig. 32]

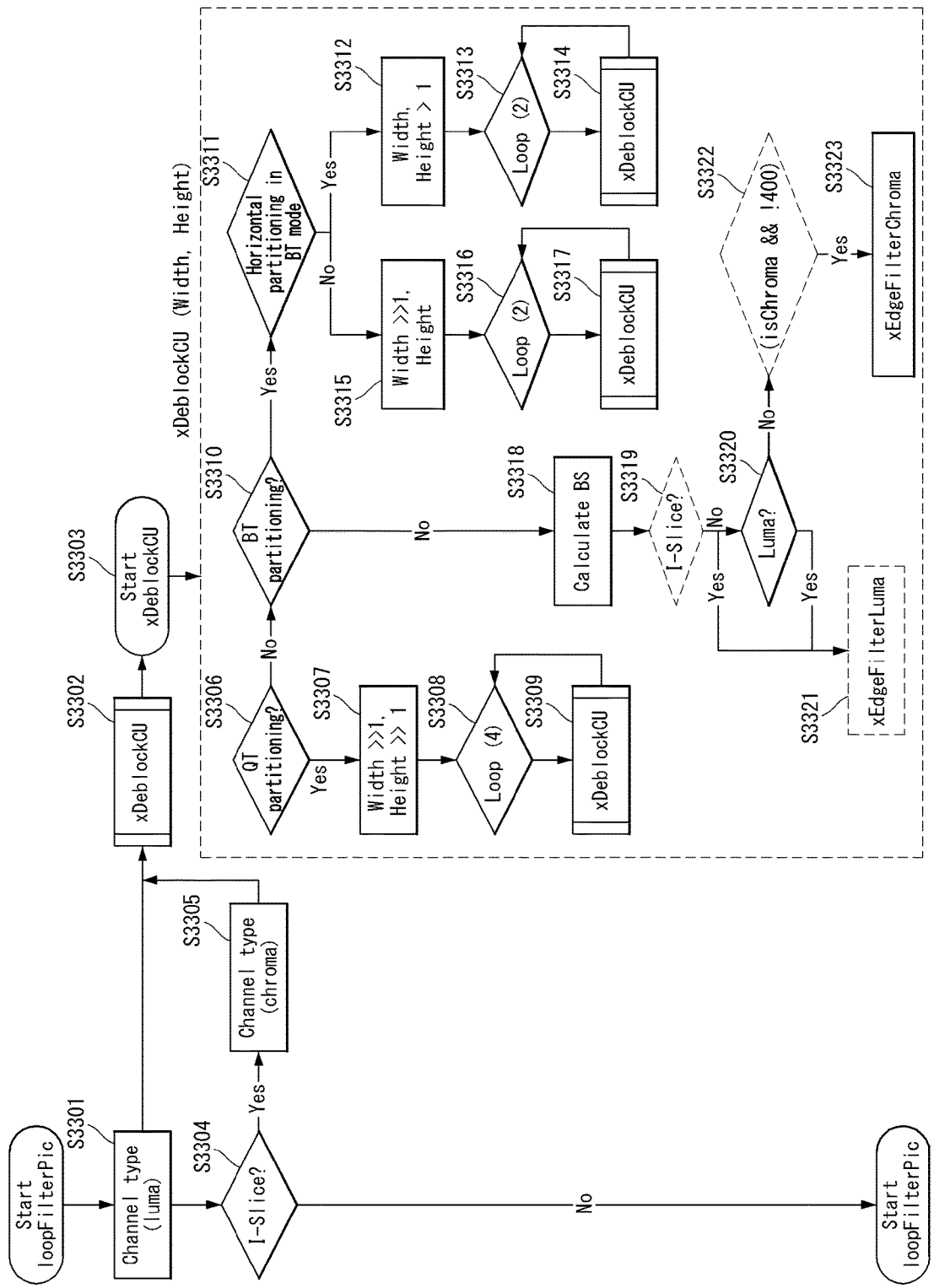

[Fig. 34]
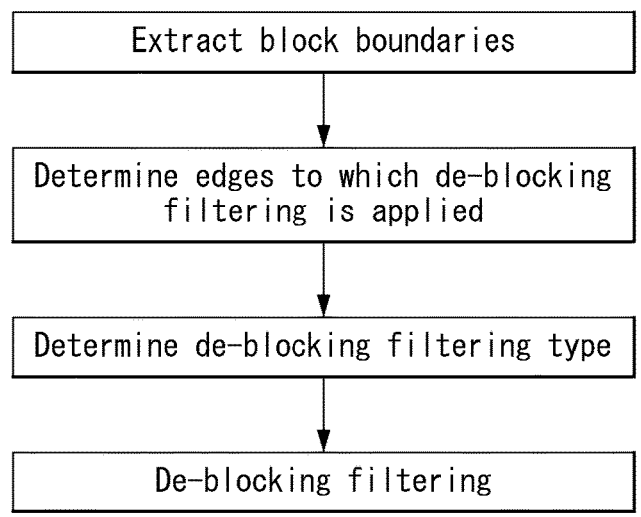
[Fig. 35]
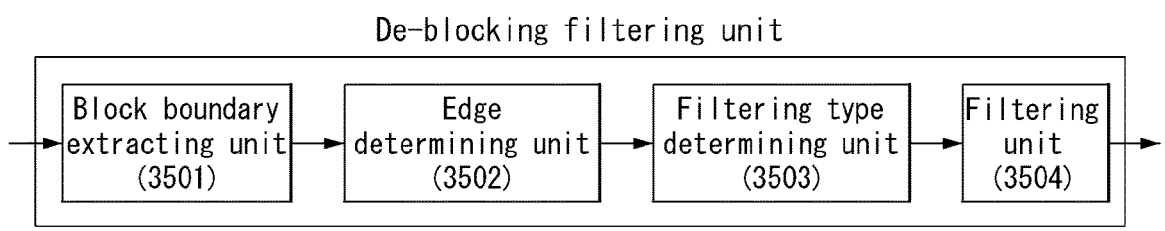

IMAGE CODING/DECODING METHOD AND APPARATUS THEREFOR

CROSS-REFERENCE TO RELATED APPLICATIONS

This application is a continuation of U.S. application Ser. No. 16/327,192, filed on Feb. 21, 2019, which is a National Stage application under 35 U.S.C. § 371 of International Application No. PCT/KR2017/009106, filed on Aug. 21, 2017, which claims the benefit of U.S. Provisional Application No. 62/377,671, filed on Aug. 21, 2016. The disclosures of the prior applications are incorporated by reference in their entirety.

TECHNICAL FIELD

The present invention relates to a method for processing a still image or video and, more particularly, to a method for performing de-blocking filtering and an apparatus supporting the method.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

SUMMARY

The present invention proposes a method for performing a post-processing filter (or an in-loop filter) efficiently in a quad-tree and binary-tree structure and an apparatus supporting the method.

Also, the present invention proposes a method for applying a de-blocking filter adaptively according to a condition based not only on the brightness (luminance) component but also on the chrominance component and an apparatus supporting the method.

Technical objects to be achieved by the present invention are not limited to the aforementioned technical objects, and other technical objects not described above may be evidently understood by a person having ordinary skill in the art to which the present invention pertains from the following description.

A method for filtering an image by a decoding apparatus according to one aspect of the present invention may comprise deriving boundaries of a block divided into quad-tree plus binary-tree structure; determining an edge among boundaries of the block to which de-blocking filtering is applied; determining a type of de-blocking filtering to be applied to the edge; and performing de-blocking filtering to a picture sample restored according to the de-blocking filtering type, wherein the edge or the type of de-blocking filtering may be determined by considering width or height of the block.

A decoding apparatus for filtering an image according to another one aspect of the present invention may comprise a block boundary deriving unit for deriving boundaries of a block divided into quad-tree plus binary-tree structure; an edge determining unit for determining an edge among boundaries of the block to which de-blocking filtering is applied; a filtering type determining unit for determining a type of de-blocking filtering to be applied to the edge; and a filtering unit for performing de-blocking filtering to a picture sample restored according to the de-blocking filtering type, wherein the edge or the type of de-blocking filtering may be determined by considering width or height of the block.

Preferably, when a type of the edge is a vertical edge, and width of the block is less than or equal to 4, the edge may be determined based on pixels for which de-blocking filtering has already been applied.

Preferably, when a type of the edge is a horizontal edge, and height of the block is less than or equal to 4, the edge may be determined based on pixels for which de-blocking filtering has already been applied.

Preferably, when a type of the edge is a vertical edge, and width of the block is less than or equal to 4, the type of de-blocking filtering may be determined based on pixels for which de-blocking filtering has already been applied.

Preferably, when a type of the edge is a horizontal edge, and height of the block is less than or equal to 4, the type of de-blocking filtering may be determined based on pixels for which de-blocking filtering has already been applied.

Preferably, when a type of the edge is a vertical edge, the edge may be determined only among boundaries of a block of which the width is larger than or equal to 8.

Preferably, when a type of the edge is a horizontal edge, the edge may be determined only among boundaries of a block of which the height is larger than or equal to 8.

Preferably, when a type of the edge is a vertical edge, and width of the block is less than or equal to 4, the type of de-blocking filtering may be determined as weak filtering.

Preferably, when a type of the edge is a horizontal edge, and height of the block is less than or equal to 4, the type of de-blocking filtering may be determined as weak filtering.

Preferably, when a type of the edge is a vertical edge, and width of the block is less than or equal to 4, the type of de-blocking filtering may be determined as strong filtering, and the strong filtering may be applied only two adjacent pixel columns on the left and right of the edge.

Preferably, when a type of the edge is a horizontal edge, and height of the block is less than or equal to 4, the type of de-blocking filtering may be determined as strong filtering, and the strong filtering may be applied only two adjacent pixel columns on the top and bottom of the edge.

Preferably, the edge may be determined based on pixels before de-blocking filtering is applied.

Preferably, the type of de-blocking filtering may be determined based on pixels before de-blocking filtering is applied.

Preferably, when a slice to which the block belongs is an intra-slice (I-slice), the types of edge and de-blocking filtering may be determined irrespective of whether the block is a chroma block.

According to an embodiment of the present invention, a de-blocking filter may be applied efficiently in the QTBT structure, thereby improving subjective and objective image quality of a still image or video.

Also, according to an embodiment of the present invention, de-blocking filtering may be speeded up through parallel implementation.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 shows a block diagram of an encoder which performs encoding of a video signal according to an embodiment of the present invention.

FIG. 2 shows a block diagram of a decoder which performs decoding of a video signal according to an embodiment of the present invention.

FIGS. 3A and 3B show a partitioning structure of a coding unit according to an embodiment of the present invention.

FIG. 4 shows a quad-tree plus binary-tree structure among partitioning structures of a coding unit according to an embodiment of the present invention.

FIG. 5 shows an internal block diagram of an in-loop filtering unit according to an embodiment of the present invention.

FIG. 6 illustrates a filtering method performed by a de-blocking filter of HEVC.

FIGS. 7A and 7B illustrate block boundaries on which filtering by a de-blocking filter of HEVC is performed.

FIG. 8 illustrates a method for determining whether to perform HEVC filtering.

FIGS. 9A and 9B illustrate a pixel region to which de-blocking filtering of HEVC is applied.

FIGS. 10A and 10B illustrate a QTBT partitioning structure according to an embodiment of the present invention.

FIGS. 11 to 21 illustrates problems which may be caused when a QTBT partitioning structure is applied to the HEVC de-blocking filtering method.

FIG. 22 illustrates a method for determining the type of a de-blocking filter according to one embodiment of the present invention.

FIG. 23 illustrates a de-blocking filtering method according to one embodiment of the present invention.

FIG. 24 illustrates a de-blocking filtering method according to one embodiment of the present invention.

FIG. 25 illustrates a de-blocking filtering method according to one embodiment of the present invention.

FIG. 26 illustrates a de-blocking filtering method according to one embodiment of the present invention.

FIGS. 27A and 27B illustrate a strong filtering method according to one embodiment of the present invention.

FIGS. 28A And 28B illustrate a strong filtering method according to one embodiment of the present invention.

FIGS. 29A and 29B show a filtering result when vertical edge filtering is applied to a block the horizontal length of which is 4 or less.

FIGS. 30A through 30C illustrate a method for determining whether to perform filtering and selecting a filter according to one embodiment of the present invention.

FIG. 31 illustrates a de-blocking filtering method according to one embodiment of the present invention.

FIG. 32 illustrates a problem caused when HEVC de-blocking filtering is applied in the same manner to the QTBT block partitioning structure.

FIG. 33 illustrates a de-blocking filtering method according to one embodiment of the present invention.

FIG. 34 illustrates a de-blocking filtering unit according to one embodiment of the present invention.

FIG. 35 illustrates a de-blocking filtering unit according to one embodiment of the present invention.

DETAILED DESCRIPTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc. may be properly replaced and interpreted in each coding process.

In the present description, "block" or "unit" refers to a unit of performing an encoding/decoding process such as prediction, transformation and/or quantization and may be composed of multi-dimension arrangement of samples (or pixels).

"Block" or "unit" may refer to multi-dimension arrangement of samples with respect to a luma component or multi-dimension arrangement of samples with respect to a chroma component. In addition, "block" or "unit" may commonly refer to multi-dimension arrangement of samples with respect to a luma component and multi-dimension arrangement of samples with respect to a chroma component.

For example, "block" or "unit" can be interpreted as the meaning including a coding block (CB) which refers to arrangement of samples to be encoded/decoded, a coding tree block (CTB) composed of a plurality of coding blocks, a prediction block (PB) (or prediction unit (PU)) which refers to arrangement of samples to which the same prediction is applied, and a transform block (TB) (or transform unit (TU)) which refers to arrangement of samples to which the same transformation is applied.

Furthermore, "block" or "unit" may be interpreted as the meaning including a syntax structure used in a process of encoding/decoding arrangement of samples with respect to a luma component and/or a chroma component unless otherwise mentioned. Here, the syntax structure refers to 0 or more syntax elements present in a bitstream in a specific order, and a syntax element refers to a data element represented in a bitstream.

For example, "block" or "unit" can be interpreted as the meaning including a coding unit (CU) including a coding block and a syntax structure used for encoding of the coding block, a coding tree unit composed of a plurality of coding units, a prediction unit (PU) including a prediction block and a syntax structure used for prediction of the prediction block, and a transform unit (TU) including a transform block and a syntax structure used for transformation of the transform block.

In addition, in the present description, "block" or "unit" is not limited to arrangement of samples (or pixels) in a square or rectangular form and may refer to arrangement of samples (or pixels) in a polygonal form having three or more vertexes. In this case, it may be referred to as a polygon block or a polygon unit.

FIG. 1 shows a block diagram of an encoder which performs encoding of a video signal according to an embodiment of the present invention.

Referring to FIG. 1, an encoder 100 comprises a picture partitioning unit 110, transform unit 130, dequantization unit 140, inverse transform unit 150, filtering unit 160, decoded picture buffer (DPB) 170, inter-prediction unit 180, intra-prediction unit 185, and entropy encoding unit 190.

The picture partitioning unit 110 may partition an input image (or picture or frame) fed into the encoder into one or more processing units. For example, the processing unit may be a coding tree unit (CTU), coding unit (CU), prediction unit (PU), or transform unit (TU).

The encoder 100 may generate a residual signal by subtracting, from the input image signal, a prediction signal output from the inter-prediction unit 180 or intra-prediction unit 185, after which the generated residual signal is fed to the transform unit 120.

The transform unit 120 may generate transform coefficients by applying a transform technique to the residual signal. For example, the transform technique may include at least one of Discrete Cosine Transform (DCT), Discrete Sine Transform (DST), Karhunen-Loève Transform (KLT), Graph-Based Transform (GBT), or Conditionally Non-linear Transform (CNT). Here, GBT means a transform obtained from a graph representing information about relations among pixels. CNT means a transform obtained based on a prediction signal generated by using all of previously reconstructed pixels. Also, the transform process may be applied to square pixel blocks of the same size or non-square blocks of variable size.

The quantization unit 130 may quantize the transform coefficients and outputs the quantized transform coefficients to the entropy encoding unit 190, where the quantized signal is entropy-coded and output as a bitstream.

A quantized signal output from the quantization unit 130 may be used to generate a prediction signal. For example, a residual signal may be reconstructed by applying dequantization and inverse transform to the quantized signal through the dequantization unit 140 and the inverse transform unit 150 inside the loop. A reconstructed signal may be generated by adding the reconstructed residual signal to the prediction signal output from the inter-prediction unit 180 or intra-prediction unit 185.

The filtering unit 160 applies filtering to the reconstructed signal and outputs or transmits the filtered reconstructed signal to a playback device or the decoded picture buffer 170. A filtered signal output to the decoded picture buffer 170 may be used as a reference picture in the inter-prediction unit 180. In this manner, not only the image quality but also the coding efficiency may be improved by using the filtered picture as a reference picture in the intra-frame prediction mode.

The decoded picture buffer 170 may store a filtered picture to use it as a reference picture in the inter-prediction unit 180.

The inter-prediction unit 180 performs temporal and/or spatial prediction with reference to a reconstructed picture to remove temporal and/or spatial redundancy.

The intra-prediction unit 185 may predict a current block by referencing samples in the surroundings of the current block to be coded. The intra-prediction unit 185 may perform the following process to perform intra-prediction. First, the intra-prediction unit 185 may prepare reference samples to generate a prediction signal. And a prediction signal may be generated by using the prepared reference samples. Afterwards, the prediction mode is encoded. At this time, reference samples may be prepared through reference sample padding and/or reference sample filtering. Since a reference sample undergoes a prediction and reconstruction processes, a quantization error may exist. Therefore, to reduce the error, a reference sample filtering process may be performed in each prediction mode used for intra-prediction.

The prediction signal generated through the inter-prediction unit 180 or the intra-prediction unit 185 may be used for generating a reconstruction signal or a residual signal.

FIG. 2 shows a block diagram of a decoder which performs decoding of a video signal according to an embodiment of the present invention.

With reference to FIG. 2, a decoder 200 may comprise an entropy decoding unit 210, dequantization unit 220, inverse transform unit 230, filtering unit 240, decoded picture buffer (DPB) unit 250, inter-prediction unit 260, and intra-prediction unit 265.

And a reconstructed image signal output through the decoder 200 may be played by a playback device.

The decoder 200 may receive a signal output from the encoder 100 of FIG. 1, where a received signal may be entropy-decoded through the entropy decoding unit 210.

The dequantization unit 220 obtains transform coefficients from the entropy-decoded signal by using quantization step size information.

The inverse transform unit 230 obtains a residual signal by inversely transforming the transform coefficients.

The obtained residual signal is added to a prediction signal output from the inter-prediction unit 260 or intra-prediction unit 265, by which a reconstructed signal is generated.

The filtering unit 240 applies filtering to the reconstructed signal and outputs the filtered reconstructed signal to a playback device or transmit the filtered reconstructed signal to the decoded picture buffer (DPB) unit 250. The filtered signal fed to the DPB unit 250 may be used as a reference picture by the inter-prediction unit 260.

In the present specification, embodiments described with reference to the filtering unit 260, inter-prediction unit 180, and intra-prediction unit 185 of the encoder 100 may be applied in the same way to the filtering unit 240, inter-prediction unit 260, and intra-prediction unit 265 of the decoder, respectively.

Image Partitioning

FIGS. 3A and 3B show a partitioning structure of a coding unit according to an embodiment of the present invention.

The encoder may partition one image (or picture) into coding tree units (CTUs) of rectangular shape. And the encoder encodes the CTUs one after the other according to a raster scan order.

One CTU may be decomposed into a quadtree (hereinafter, it is denoted as 'QT') structure. For example, one CTU may be subdivided into four square-shaped units, where the edge length of each unit is one-half of the corresponding edge of CTU. Such partitioning in a QT structure may be performed recursively.

Referring to FIGS. 3A and 3B, the root note of the QT may be associated with a CTU. A QT may be decomposed until it reaches leaf nodes, where, at this time, the leaf node may be referred to as a coding unit (CU).

Referring to FIGS. 3A and 3B, a CTU corresponds to the root node and has the smallest depth value (i.e., level 0). Depending on the characteristics of an image, a CTU may not be subdivided, for which case the CTU corresponds to the CU.

A CTU may be subdivided in a QT structure and as a result, child nodes having a depth of level 1 may be generated. A node which is no longer subdivided from the child node at the depth of level 1 (i.e., a leaf node) corresponds to a CU. For example, in FIG. 3(b), CU(a), CU(b), and CU(j) corresponding to node a, b, and j have been subdivided from the CTU once and have a depth of level 1.

For each CU, information indicating whether the corresponding CU is subdivided may be transmitted to the decoder. For example, the information may be defined by a split flag, which may be expressed by a syntax element "split_cu_flag". The split flag may be included in all of the CUs except for an SCU. For example, if the split flag is '1', the corresponding CU is further subdivided into four CUs whereas, if the split flag is '0', the corresponding CU is no longer subdivided, and a coding process may be performed on the corresponding CU.

Although the embodiment of FIGS. 3A and 3B describe a process for subdividing a CU, the same QT structure described in detail above may also be applied to the process of subdividing a transform unit (TU) which is a basic unit for performing transform.

A TU may be subdivided hierarchically in the QT structure from a CU to be coded. For example, a CU may correspond to the root node of a tree associated with the TU.

Since a TU is subdivided in the QT structure, a TU subdivided from a CU may be further subdivided into smaller Tus. For example, the size of a TU may be determined by one of 32×32, 16×16, 8×8, and 4×4; however, the present invention is not limited to the specific example, and in the case of a high-resolution image, the size of a TU may be increased or have various values.

For each TU, information indicating whether the corresponding TU is subdivided may be transmitted to the decoder. For example, the information may be defined by a split transform flag, which may be expressed by a syntax element "split_transform_flag".

As described above, a CU is a basic unit for coding, by which intra-prediction or inter-prediction is performed. To perform coding of an input image more efficiently, a CU may be subdivided into prediction units (PUs).

A PU is a basic unit for generating a prediction block which may be generated differently in terms of PUs even within one CU. PUs may be subdivided differently from a CU depending on whether the intra-prediction mode or inter-prediction mode is used for the coding mode of the CU.

FIG. 4 shows a quad-tree plus binary-tree structure among partitioning structures of a coding unit according to an embodiment of the present invention.

The encoder may partition one image (or picture) into coding tree units (CTUs) of rectangular shape. And the encoder encodes the CTUs one after the other according to a raster scan order.

One CTU may be decomposed into a quadtree (hereinafter, it is denoted as 'QT') and binarytree (hereinafter, it is denoted as 'BT') structure. For example, one CTU may be subdivided into four square-shaped units, where the edge length of each unit is one-half of the corresponding edge of CTU or may be subdivided into two rectangular units, where width or height of each unit is one-half of the corresponding CTU. Such partitioning in a QTBT structure may be performed recursively.

Referring to FIG. 4, the root note of the QT may be associated with a CTU. A QT may be decomposed until it reaches QT leaf nodes, where a QT leaf node may be subdivided into a BT which may be further subdivided until BT leaf nodes are reached.

Referring to FIG. 4, a CTU corresponds to the root node and has the smallest depth value (i.e., level 0). Depending on the characteristics of an image, a CTU may not be subdivided, for which case the CTU corresponds to the CU.

A CTU may be subdivided in a QT structure, and a QT leaf node may be subdivided in a BT structure. As a result, child nodes having a depth of level n may be generated. And A node which is no longer subdivided from the child node at the depth of level n (i.e., a leaf node) corresponds to a CU.

For each CU, information indicating whether the corresponding CU is subdivided may be transmitted to the decoder. For example, the information may be defined by a split flag, which may be expressed by a syntax element "split_cu_flag". Also, information indicating whether a QT leaf node is subdivided into a BT may be transmitted to the decoder. For example, the information may be defined by a BT split flag, which may be expressed by a syntax element "bt_split_flag". In addition, when a QT leaf node is subdivided into a BT by the split_bt_flag, a BT subdivision shape may be transmitted to the decoder so that the region corresponding to the QT leaf node is subdivided into rectangles the width of which is one-half of the width of the region or rectangles the height of which is one-half of the height of the region. For example, the information may be defined by a BT split mode, which may be expressed by "bt_split_mode".

FIG. 5 shows an internal block diagram of an in-loop filtering unit according to an embodiment of the present invention.

The in-loop filtering unit may include at least one of a de-blocking filtering unit 510, adaptive offset filtering unit 520, and adaptive loop filtering unit 530.

The in-loop filtering unit applies filtering to a reconstructed picture and outputs the filtered picture to a playback device or stores the filtered picture in a buffer to use it as a reference picture in the inter-prediction mode.

The de-blocking filtering unit 510 performs the function of alleviating a distortion problem occurring at the boundaries of a reconstructed picture. For example, blocking degradation occurring at the boundaries of a prediction unit or transform unit may be improved.

First, the de-blocking filtering unit 510 may check discontinuity of reconstructed pixel values at the block boundaries and when blocking degradation is observed, may perform de-blocking filtering at the corresponding edge boundary. For example, the de-blocking filtering unit 510 may determine whether a block boundary is an 8×8 block boundary and the boundary of a prediction unit or transform unit; and based on the determination result, may calculate a boundary strength (BS) value. Based on the BS value, whether to perform filtering may be determined, where filtering parameters may be used together.

A more detailed description about a method for performing filtering by a de-blocking filtering unit 510 will be given later.

The adaptive offset filtering unit 520 may perform the function of adding an offset to reconstructed pixels and minimize the error between a reconstructed image and the original image. Here, the reconstructed image may be a de-blocking filtered image. In the case of the encoder, it calculates an offset parameter for compensating for the error between a reconstructed image and the original image and transmits the calculated offset parameter to the decoder; in the case of the decoder, it performs entropy-decoding on the received offset parameter and performs filtering in pixel units based on the entropy-decoded offset parameter.

The adaptive loop filtering unit 530 may perform filtering by calculating optimal coefficients which minimize the error between the original image and a reconstructed image. In the case of the encoder, it may derive filter coefficients which minimize the error between the original image and a reconstructed image and may transmit, to the decoder, information about whether to adaptive loop filtering and filter coefficients adaptively for each block. In the case of the decoder, it may perform filtering based on the received information about whether to apply and filter coefficients.

FIG. 6 illustrates a filtering method performed by a de-blocking filter of HEVC.

Referring to FIG. 6, a de-blocking filter determines boundaries on which de-blocking filtering is to be applied.

At this time, it should be noted that determination of boundaries indicates determination of positions (i.e., boundaries) at which de-blocking filtering is required, and whether to actually perform filtering is determined at the filter on/off step in the S604 step.

The boundaries for de-blocking filter may be divided into three types: coding unit (CU) boundary, prediction unit (PU) boundary, and transform unit (TU) boundary. Since one CU boundary may correspond to a PU or TU boundary, it may correspond to a boundary target which requires filtering.

The de-blocking filter calculates BS S602. In other words, the de-blocking filter determines boundary strength (BS) to perform a de-blocking filter with a different strength according to the characteristics of blocks adjacent to the boundary.

The de-blocking filter determines parameters $\beta$, $t_c$ used as threshold values for determining whether to perform filtering and filtering selection S603.

The de-blocking filter performs a filter on/off decision S604. In other words, the de-blocking filter determines whether to perform filtering for each filtering unit.

The de-blocking filter determines whether to perform a strong or weak filter at the boundary along which filtering is supposed to be applied S605.

The de-blocking filter performs filtering on the pixels by using a determined filter S606, S607.

De-Blocking Filtering Method for Quad-Tree Binary-Tree (QTBT) Structure

Before describing an embodiment of the present invention, characteristics of a de-blocking filter of HEVC and the de-blocking filter operation of QTBT structure will be described, and a problem of the de-blocking filter of QTBT structure will be pointed out.

First, a de-blocking filter of HEVC performs filtering at the boundary of a prediction blocks (PB) and at the boundary of a transform blocks (TB). However, since there is no boundary defined for a transform block and prediction block in the QTBT, filtering may be performed at the boundaries of a coding block (CB).

It should be noted that the de-blocking filter of HEVC and QTBT does not necessarily perform unconditional filtering along all of the boundaries but performs strong and weak filtering selectively only when a specific condition is satisfied (which is determined at the S604 step of FIG. 6). On the other hand, when the condition is not satisfied, filtering is not performed on the corresponding boundary.

FIGS. 7A and 7B illustrate block boundaries on which filtering by a de-blocking filter of HEVC is performed.

FIG. 7A illustrates vertical edges occurring at filtering boundaries along with filtering by a de-blocking filter of HEVC is performed, and FIG. 7B illustrates horizontal edges occurring at filtering boundaries along with filtering by a de-blocking filter of HEVC is performed.

As FIG. 7A shows, the de-blocking filter of HEVC is performed at boundaries of prediction and transform blocks. However, it does not necessarily indicate that filtering is performed on all of the prediction block boundaries or transform block boundaries; rather, the filtering is performed only on the boundaries of blocks size of which is 8×8 or larger. This filtering scheme may be regarded as being designed to support parallel processing of a de-blocking filter.

As described above, whether to apply filtering at a boundary is determined, and when a filtering condition is met, a strong or weak filter is performed selectively.

At this time, to determine whether to apply filtering, values of pixels adjacent to a block boundary are checked, which will be described in more detail below with reference to FIG. 8.

FIG. 8 illustrates a method for determining whether to perform HEVC filtering.

In FIG. 8, a solid line represents a block boundary, and each circle represents one pixel (for example, a luma component sample or chroma component sample).

Referring to FIG. 8, x and y-axis coordinates of three pixels on either side of a block boundary (shaded pixels in FIG. 8) are denoted as p(x, y) (or q(x, y)) with reference to the block boundary as shown in FIG. 8. Then according to Eq. 1 below, which describes a condition for applying filtering, variables (parameters) dp0, dp3, dq0, dq3, dpq0, dpq3, and d may be calculated.

$$dp0 = |p_{(2,0)} - 2 \times p_{(1,0)} + p_{(0,0)}|$$

$$dp3 = |p_{(2,3)} - 2 \times p_{(1,3)} + p_{(0,3)}|$$

$$dq0 = |q_{(2,0)} - 2 \times q_{(1,0)} + q_{(0,0)}|$$

$$dq3 = |q_{(2,3)} - 2 \times q_{(1,3)} + q_{(0,3)}|$$

$$dpq0 = dp0 + dq0$$

$$dq3 = dp3 + dq3$$

$$d = dpq0 + dpq3 \qquad [\text{Eq. 1}]$$

The variable (parameter) d calculated by Eq. 1 is compared with a variable (parameter) $\beta$ determined based on a quantization parameter (Q), and de-blocking filtering is performed only when d is smaller than $\beta$.

Here, pertaining to a method for determining a quantization parameter Q and variable (parameter) β, the ITU-T H.265 document is incorporated by reference in the present specification.

As described above, if pixels on the corresponding block boundary satisfy the condition for applying filtering, then a strong or a weak filter may be applied according to Eq. 2 below.

If all of the conditions of Eq. 2 are satisfied, a strong filter is applied; otherwise, a weak filter is applied.

① $(\beta \gg 2) > 2 \times (dp0 + dq0)$

② $(\beta \gg 2) > 2 \times (dp3 + dq3)$

③ $(\beta \gg 3) > \{(p_{(3,0)} - p_{(0,0)}) + (q_{(3,0)} - q_{(0,0)})\}$

④ $(\beta \gg 3) > \{(p_{(3,3)} - p_{(0,3)}) + (q_{(3,3)} - q_{(0,3)})\}$

⑤ $((5 \times tc + 1) \gg 1) > |p_{(0,0)} - q_{(0,0)}|$ ★

⑥ $((5 \times tc + 1) \gg 1) > |p_{(0,3)} - q_{(0,3)}|$  [Eq. 2]

In Eq. 2, the variable (parameter) tc (i.e., $t_c$) is determined based on the quantization parameter (Q).

Here, pertaining to a method for determining the variable (parameter) tc (i.e., $t_c$), the ITU-T H.265 document is incorporated by reference in the present specification.

The pixel region to which filtering is applied is varied according to the filter type (i.e., strong or weak filter) determined by the condition of Eq. 2, as described below.

FIGS. 9A and 9B illustrate a pixel region to which de-blocking filtering of HEVC is applied.

As shown in FIGS. 9A and 9B, the pixel region for a strong or a weak filter is different with respect to a block boundary.

As described above, whether to apply de-blocking filtering is determined by using three pixels on the left and right or on the top and bottom of a block boundary. Furthermore, a de-blocking filter type is determined again by using four pixels on the left and right or on the top and bottom of the block boundary along the boundary to which the de-blocking filtering is applied.

Pertaining to the HEVC de-blocking filtering method described above, the ITU-T H.265 document is incorporated by reference in the present specification.

Due to these reasons, even though 4×4 prediction or transform block, 8×4 and 4×8 prediction block may be generated, HEVC allows de-blocking filtering to be applied only for boundaries of blocks 8×8 or larger at the cost of parallel implementation.

On the other hand, in the case of QTBT, a luma and chroma blocks in the intra-slice (I-slice) (i.e., a slice decoded by using intra-prediction only) have different structures from each other, and coding blocks of various shapes and sizes may be generated due to the quadtree and binarytree structure.

FIGS. 10A and 10B illustrate a QTBT partitioning structure according to an embodiment of the present invention.

As shown in FIGS. 10A and 10B, since filtering is performed along all of the boundaries, and the de-blocking method of HEVC is applied in the same way, not only parallel implementation but also filtering on the chroma component is not performed effectively.

According to FIGS. 10A and 10B, an image may be subdivided into sub-regions of various sizes and shapes by applying the QTBT structure.

Therefore, the present invention proposes a method for performing a de-blocking filter in a parallel fashion on various block partitioning structures (i.e., partitioning structures having various block sizes and shapes).

As shown in FIGS. 10A and 10B, a de-blocking filter of QTBT applies the de-blocking filter of HEVC in the same manner, but the former may be applied not only for the boundaries of blocks of which the size is 8×8 or larger but also for the boundaries of blocks of which the size is 4×4, 4×8, 8×4, 4×16, and so on.

However, in this case, a problem may occur that filtering on the corresponding block boundary may not satisfy a condition for parallel implementation because of a change of pixel values due to filtering on the boundaries of adjacent blocks.

FIGS. 11 to 21 illustrates problems which may be caused when a QTBT partitioning structure is applied to the HEVC de-blocking filtering method.

The aforementioned problem will be described when an image is subdivided into the QTBT structure as shown in FIG. 11 with an example of a vertical edge of a 4×16 block as shown in FIG. 12.

At this time, it is assumed that strong filtering is performed on a vertical edge (i.e., block boundary 1) of a first 4×16 block as shown in FIG. 12.

In this case, filtering changes the values of three pixels (shaded pixels in FIG. 12) adjacent to the block boundary. And it is assumed that the filtering removes noise at the block boundary 1.

In order to perform filtering at the next adjacent block boundary (i.e., block boundary 2), whether to perform filtering on the pixels indicated by dotted lines in FIG. 13 is determined first.

However, in this case, a problem occurs that filtering now has to be determined by referring to the filtered pixels (shaded pixels in FIG. 12) in the example of FIG. 12 and unfiltered pixels (not-shaded pixels in FIG. 12).

First, focusing on the parallel implementation issue, filtering of block boundary 1 and 2 may not be performed simultaneously as shown in FIG. 13, thereby impairing the parallel pipeline.

Even if the parallel implementation of FIG. 13 is not considered, a problem occurs that filtering may be applied being overlapped as shown in FIG. 14.

As shown in FIG. 14, a low-pass filter of the de-blocking filter is applied twice to the pixels in black color of FIG. 14 if the pixels satisfy the filtering condition at the block boundary 2 and at the same time, satisfy the condition for strong filtering.

Also, a problem occurs that even if weak filtering rather than strong filtering is applied on the block boundary 2 as shown in FIG. 15, a low-pass filter is applied twice to the pixels in black color of FIG. 15.

Now it is furthermore assumed that weak filtering has been applied to the block boundary 1 as shown in FIG. 16.

In this case, as shown in FIG. 17, to determine whether to apply filtering to the block boundary 2, pixels indicated by dotted lines are referenced.

Also, even if it has been determined to apply filtering to the block boundary 2, to further determine which filter to apply between a strong and a weak filter, Eq. 2 is employed by referring to the pixels indicated by dotted lines of FIG. 18.

If weak filtering is performed on the block boundary 2 as the condition for strong filtering is not satisfied at the block boundary 2, overlap of filtering may be avoided as shown in FIG. 19; however, if the condition for strong filtering is satisfied, and strong filtering is accordingly applied to the block boundary 2, a problem is occurred that the dark-shaded pixels of FIG. 20 are filtered repeatedly.

In what follows, vertical edges are mainly used for the description of the present invention, but it should be understood that it is intended only for the convenience of description, and the present invention is not limited to the specific descriptions. In other words, in the case of a horizontal edge, the only difference from the description based on a vertical edge is that pixels are located on the top and bottom of a block boundary, and the remaining process may be performed in the same manner.

Embodiment 1

One embodiment of the present invention proposes a method for performing a de-blocking filter of QTBT structure in an efficient manner.

As described above, if a de-blocking method defined in the HEVC is applied directly to a QTBT block structure, a problem may occur that prevents parallel processing from being performed in the QTBT structure since whether to apply filtering is calculated by referring to filtered pixels at a block boundary.

To prevent the problem, the present invention proposes a method for performing de-blocking filtering at a boundary of a block the horizontal size/length of which is 4 or less (i.e., a block the number of samples of which is 4 or less in the horizontal direction) in the case of a vertical edge and at a boundary of a block the vertical size of which is 4 or less in the case of a horizontal edge.

1) Embodiment 1-1

According to one embodiment of the present invention, a filtering method for a de-blocking filter in the QTBT structure is proposed, which performs de-blocking filtering on a block the horizontal length of which is 4 or less for vertical edges and a block the vertical length of which is 4 or less for horizontal edges.

As described above, a problem that may occur when de-blocking filtering is performed in the QTBT structure may be further divided into two cases: a problem related to parallel implementation and a problem related to filtering of reference pixels when determining whether to apply filtering and selecting an adaptive filter.

As in the de-blocking filtering of HEVC described above, by not performing filtering on a block boundary satisfying a specific condition (for example, a boundary of a block the horizontal length of which is 4 or less or a boundary of a block the vertical length of which is 4 or less), parallel implementation may be realized; however, at the same time, since filtering is not performed on the corresponding block boundary, a problem may occur that causes degradation of objective and subjective image quality.

In this regard, one embodiment of the present invention proposes a filtering method applied to a block boundary when a specific condition is satisfied.

Here, the specific condition implies a case where the horizontal length of a block is 4 or less when vertical edges are filtered and/or a case where the vertical length of a block is 4 or less when horizontal edges are filtered.

Under the specific condition above, when it is determined whether to perform filtering by referring to filtered pixels as illustrated in FIG. 13, pixels from which noise has been already removed through filtering may be used.

FIG. 21 illustrates a method for determining whether to perform de-blocking filtering according to one embodiment of the present invention.

Referring to FIG. 21 and Eq. 3 below, d may be regarded as denoting a sum of the amount of change of pixel values along block boundaries.

At this time, since pixels of the P block (i.e., shaded pixels among those pixels indicated by dotted lines in FIG. 22) have already been subjected to filtering and thereby have smoothed values, the probability of exhibiting a smaller value than a difference of values of unfiltered pixels is high.

Therefore, the final value of d calculated by Eq. 3 may become small, and as a result, when it is checked whether to perform filtering, the ratio of performing filtering may be increased with a high probability.

$$dp0 = |p_{(2,0)} - 2 \times p_{(1,0)} + p_{(0,0)}|$$

$$dp3 = |p_{(2,3)} - 2 \times p_{(1,3)} + p_{(0,3)}|$$

$$dq0 = |q_{(2,0)} - 2 \times q_{(1,0)} + q_{(0,0)}|$$

$$dq3 = |q_{(2,3)} - 2 \times q_{(1,0)} + q_{(0,0)}|$$

$$dpq0 = dp0 + dq0$$

$$dpq3 = dp3 + dq3$$

$$d = dpq0 + dpq3 \quad [\text{Eq. 3}]$$

Also, under the specific condition, a filter type may be determined by referring to filtered pixels.

FIG. 22 illustrates a method for determining the type of a de-blocking filter according to one embodiment of the present invention.

Referring to FIG. 22 and Eq. 4, the equation referenced to adaptively select a strong or weak filter also considers the amount of change of pixel values at block boundaries.

At this time, since pixels of the P block (i.e., shaded pixels among those pixels indicated by dotted lines in FIG. 22) have already been subjected to filtering, the pixels are smoothed and therefore, the amount of change in pixel values may be reduced. Due to this effect, the condition for applying strong filtering illustrated in Eq. 4 is satisfied, and as a result, a strong filter may be performed more often than a weak filter.

Therefore, a strong filter is made to be applied to the pixels which have been already filtered, leading to blurring of edges at block boundaries.

① $(\beta >> 2) > 2 \times (dp0 + dq0)$

② $(\beta >> 2) > 2 \times (dp3 + dq3)$

③ $(\beta >> 3) > \{(p_{(3,0)} - p_{(0,0)}) + (q_{(3,0)} - q_{(0,0)})\}$

④ $(\beta >> 3) > \{(p_{(3,3)} - p_{(0,3)}) + (q_{(3,3)} - q_{(0,3)})\}$

⑤ $((5 \times tc + 1) >> 1) > |p_{(0,0)} - q_{(0,0)}|$

⑥ $((5 \times tc + 1) >> 1) > |p_{(0,3)} - q_{(0,3)}| \quad [\text{Eq. 4}]$

2) Embodiment 1-2

For a de-blocking filter of QTBT structure, one embodiment of the present invention proposes a method for not performing filtering on a block the horizontal length of which is 4 or less for filtering of vertical edges or not performing filtering on a block the vertical length of which is 4 or less for filtering of horizontal edges.

As described above, a de-blocking filter in the current QTBT structure has many issues pertaining to the process of filtering boundaries of a block of a specific size. To avoid the aforementioned issues and enable parallel implementation of de-blocking filtering, one embodiment of the present invention proposes a method as illustrated in FIG. 23.

FIG. 23 illustrates a de-blocking filtering method according to one embodiment of the present invention.

Referring to FIG. 23, a decoder determines whether it corresponds to a boundary of a coding unit (or coding block) S2301.

If it does not correspond to a boundary of a coding unit (or coding block) at the S2301 step, the decoder terminates de-blocking filtering.

On the other hand, if it corresponds to a boundary of a coding unit (or coding block) at the S2301 step, the decoder determines whether the corresponding boundary is a vertical edge S2302.

If the corresponding boundary corresponds to a vertical edge at the S2302 step, the decoder determines whether the width of the corresponding coding unit (or coding block) is 8 or larger S2303.

On the other hand, if the corresponding boundary does not correspond to a vertical edge at the S2302 step (i.e., if it corresponds to a horizontal edge), the decoder determines whether the height of the corresponding coding unit (or coding block) is 8 or larger S2304.

If the width of the corresponding coding unit (or coding block) is 8 or larger at the S2303 step or if the height of the corresponding coding unit (or coding block) is 8 or larger at the S2304 step, the decoder performs conventional de-blocking filtering S2305.

For example, the decoder may perform conventional de-blocking filtering as shown in FIG. 6.

Here, pertaining to the conventional de-blocking filtering method, the ITU-T H.265 document is incorporated by reference in the present specification.

Meanwhile, if the width of the corresponding coding unit (or coding block) is less than 8 at the S2303 step or if the height of the corresponding coding unit (or coding block) is less than 8 at the S2304 step, the decoder terminates de-blocking filtering.

As illustrated in FIG. 23, filtering may be performed only on a coding unit (or coding block) the horizontal length of which is 8 or larger in the case of a vertical edge and only on a coding unit (or coding block) the vertical length of which is 8 or larger in the case of a horizontal edge whereas the filtering may not be performed for a coding unit (or coding block) of which the width or height is less than 8.

As described above, in the present embodiment determines, since only the block size is considered to determine whether to apply filtering, the proposed method provides the simplest way of realizing parallel implementation of de-blocking filtering.

3) Embodiment 1-3

For a de-blocking filter of QTBT structure, one embodiment of the present invention proposes a method for performing weak filtering on a block the horizontal length of which is 4 or less for filtering vertical edges or performing weak filtering on a block the vertical length of which is 4 or less for filtering horizontal edges.

FIG. 24 illustrates a de-blocking filtering method according to one embodiment of the present invention.

Referring to FIG. 24, a decoder determines whether it corresponds to a boundary of a coding unit (or coding block) S2401.

If it does not correspond to a boundary of a coding unit (or coding block) at the S2401 step, the decoder terminates de-blocking filtering.

On the other hand, if it corresponds to a boundary of a coding unit (or coding block) at the S2401 step, the decoder determines whether the corresponding boundary is a vertical edge S2402.

If the corresponding boundary corresponds to a vertical edge at the S2402 step, the decoder determines whether the width of the corresponding coding unit (or coding block) is 8 or larger S2403.

On the other hand, if the corresponding boundary does not correspond to a vertical edge at the S2402 step (i.e., if it corresponds to a horizontal edge), the decoder determines whether the height of the corresponding coding unit (or coding block) is 8 or larger S2404.

If the width of the corresponding coding unit (or coding block) is 8 or larger at the S2403 step or if the height of the corresponding coding unit (or coding block) is 8 or larger at the S2404 step, the decoder performs conventional de-blocking filtering S2305.

For example, the decoder may perform conventional de-blocking filtering as shown in FIG. 6.

Here, pertaining to the conventional de-blocking filtering method, the ITU-T H.265 document is incorporated by reference in the present specification.

Meanwhile, if the width of the corresponding coding unit (or coding block) is less than 8 at the S2403 step, the decoder may apply a weak filter to the corresponding vertical edge S2406.

Also, if the height of the corresponding coding unit (or coding block) is less than 8 at the S2404 step, the decoder may apply a weak filter to the corresponding horizontal edge S2407.

Here, pertaining to the method for applying a weak filter, the ITU-T H.265 document is incorporated by reference in the present specification.

As illustrated in FIG. 24, conventional de-blocking filtering may be performed only on a coding unit (or coding block) the horizontal length of which is 8 or larger in the case of a vertical edge and only on a coding unit (or coding block) the vertical length of which is 8 or larger in the case of a horizontal edge whereas a weak filter may be performed for a coding unit (or coding block) of which the width or height is less than 8.

As described above, the proposed method according to the present embodiment may minimize degradation of subjective image quality, which is caused as filtering is not performed on small-sized blocks in the embodiment 1-2.

4) Embodiment 1-4

For a de-blocking filter of QTBT structure, one embodiment of the present invention proposes a method for performing a strong filter only on two pixels respectively on the left and right of a boundary of a block the horizontal length of which is 4 or less for filtering of vertical edges and performing a strong filter only on two pixels respectively on the top and bottom of a boundary of a block the vertical length of which is 4 or less for filtering of horizontal edges.

At this time, as shown in FIG. 25, one embodiment of the present invention proposes a method for applying strong filtering for a block the horizontal length of which is 4 or less and a block the vertical length of which is 4 or less without selecting a filter set.

FIG. 25 illustrates a de-blocking filtering method according to one embodiment of the present invention.

Referring to FIG. 25, a decoder determines whether a pixel corresponds to a boundary of a coding unit (or coding block) S2501.

If a pixel does not correspond to a boundary of a coding unit (or coding block) at the S2501 step, the decoder terminates de-blocking filtering.

On the other hand, if a pixel corresponds to a boundary of a coding unit (or coding block) at the S2501 step, the decoder checks a condition for applying a de-blocking filter S2502 and determines whether to apply a de-blocking filter at the corresponding boundary based on the condition for applying a de-blocking filter S2503.

At this time, Eq. 1 above may be used as the condition for applying a de-blocking filter.

If the decoder determines not to apply a de-blocking filter at the boundary of a coding unit (or coding block) at the S2503 step (i.e., the condition for applying a de-blocking filter is not satisfied), the decoder terminates de-blocking filtering.

On the other hand, if the decoder determines to apply a de-blocking filter at the boundary of a coding unit (or coding block) at the S2503 step (i.e., the condition for applying a de-blocking filter is satisfied), the decoder determines whether the corresponding boundary corresponds to a vertical edge S2504.

If the corresponding boundary corresponds to a vertical edge at the S2504 step, the decoder determines whether the width of the corresponding coding unit (or coding block) is 8 or larger S2505.

On the other hand, if the corresponding boundary does not correspond to a vertical edge (i.e., the corresponding boundary is a horizontal edge) at the S2504 step, the decoder determines whether the height of the corresponding coding unit (or coding block) is 8 or larger S2506.

If the width of the corresponding coding unit (or coding block) is less than 8 at the S2505 step or if the height of the corresponding coding unit (or coding block) is less than 8 at the S2506 step, the decoder performs de-blocking filtering by applying a strong filter proposed in the present embodiment S2507.

If a strong filter proposed in the present embodiment is applied, strong filtering is performed only on two pixels respectively on the left and right of a block boundary (in the case of a vertical edge) or on the top and bottom of a block boundary (in the case of a horizontal edge), which will be described in detail later.

Meanwhile, if the width of the corresponding coding unit (or coding block) is 8 or larger at the S2505 step or if the height of the corresponding coding unit (or coding block) is 8 or larger at the S2506 step, the decoder checks a condition for selecting a filter set S2508 and determines whether to apply a strong filter to the corresponding edge based on the condition for selecting a filter set S2509.

At this time, Eq. 2 may be used as the condition for selecting a filter set.

If it is determined to apply a strong filter at the S2509 step (for example, if the conditions expressed by Eq. 2 are all satisfied), the decoder may apply a conventional strong filter to the corresponding edge S2510.

Here, for example, pertaining to a method for applying a strong filter, the ITU-T H.265 document may be incorporated by reference in the present specification.

Meanwhile, if it is determined not to apply a strong filter at the S2509 step (for example, if any one of the conditions of Eq. 2 is not satisfied), the decoder may apply a weak filter to the corresponding edge S2511.

Here, for example, pertaining to a method for applying a weak filter, the ITU-T H.265 document may be incorporated by reference in the present specification.

Also, as shown in FIG. 26, for the block boundaries to which a strong filter is required to be applied while a conventional processing structure is maintained, a method for applying a strong filter according to the present invention is proposed.

FIG. 26 illustrates a de-blocking filtering method according to one embodiment of the present invention.

Referring to FIG. 26, a decoder determines whether a it corresponds to a boundary of a coding unit (or coding block) S2601.

If a it does not correspond to a boundary of a coding unit (or coding block) at the S2601 step, the decoder terminates de-blocking filtering.

On the other hand, if a pixel corresponds to a boundary of a coding unit (or coding block) at the S2601 step, the decoder checks a condition for applying a de-blocking filter S2602 and determines whether to apply a de-blocking filter at the corresponding boundary based on the condition for applying a de-blocking filter S2603.

At this time, Eq. 1 above may be used as the condition for applying a de-blocking filter.

If the decoder determines not to apply a de-blocking filter at the boundary of a coding unit (or coding block) at the S2603 step (i.e., the condition for applying a de-blocking filter is not satisfied), the decoder terminates de-blocking filtering.

On the other hand, if the decoder determines to apply a de-blocking filter at the boundary of a coding unit (or coding block) at the S2603 step (i.e., the condition for applying a de-blocking filter is satisfied), the decoder checks a condition for selecting a filter set S2604 and determines whether to apply a strong filter at the corresponding boundary based on the condition for selecting a filter set S2605.

At this time, Eq. 2 may be used as the condition for selecting a filter set.

If it is determined not to apply a strong filter at the S2605 step (for example, if any one of the conditions of Eq. 2 is not satisfied), the decoder may apply a weak filter to the corresponding edge S2606.

Here, for example, pertaining to a method for applying a weak filter, the ITU-T H.265 document may be incorporated by reference in the present specification.

Meanwhile, if it is determined to apply a strong filter at the S2605 step (for example, if the conditions of Eq. 2 are all satisfied), the decoder determines whether the corresponding boundary correspond to a vertical edge S2607.

If the corresponding boundary corresponds to a vertical edge at the S2607 step, the decoder determines whether the width of the corresponding coding unit (or coding block) is 8 or larger S2608.

Meanwhile, if the corresponding boundary does not correspond to a vertical edge at the S2607 step (i.e., it corresponds to a horizontal edge), the decoder determines whether the height of the corresponding coding unit (or coding block) is 8 or larger S2609.

If the width of the corresponding coding unit (or coding block) is less than 8 at the S2609 step or if the height of the corresponding coding unit (or coding block) is less than 8 at the S2608 step, the decoder performs de-blocking filtering by applying a strong filter proposed in the present embodiment S2610.

If a strong filter proposed in the present embodiment is applied, strong filtering is performed only on two pixels respectively on the left and right of a block boundary (in the case of a vertical edge) or on the top and bottom of a block boundary (in the case of a horizontal edge), which will be described in detail later.

Meanwhile, if the width of the corresponding coding unit (or coding block) is 8 or larger at the S2609 step or if the height of the corresponding coding unit (or coding block) is 8 or larger at the S2608 step, the decoder may apply a conventional strong filter to the corresponding edge S2611.

Here, for example, pertaining to a method for applying a strong filter, the ITU-T H.265 document may be incorporated by reference in the present specification.

In what follows, a strong filtering method according to one embodiment of the present invention will be described.

A strong filtering method proposed in the present invention uses the conventional HEVC filter as shown in FIGS. 27A and 27B but may apply filtering only to two pixels respectively on the left and right of a boundary (or edge) (in the case of a vertical edge). On the other hand, in the case of a horizontal edge, the strong filtering method may apply filtering only to two pixels respectively on the left and right of a boundary.

FIGS. 27A and 27B illustrate a strong filtering method according to one embodiment of the present invention.

FIG. 27A illustrates pixels before filtering is applied according to one embodiment of the present invention, and FIG. 27B illustrates pixels (shaded pixels) after filtering is applied according to one embodiment of the present invention.

Referring to FIGS. 27A and 27B and Eq. 5, filtering may be applied only two pixels respectively on the left and right of a vertical edge (i.e., P(0,0), P(1,0), P(0,1), P(1,1), P(0,2), P(1,2), P(0,3), P(1,3), Q(0,0), Q(1,0), Q(0,1), Q(1,1), Q(0,2), Q(1,2), Q(0,3), Q(1,3)).

$P'_{(0,0)}$=Clip3($p0$−2$tc$,$p0$+2$tc$,($p2$+2$p1$+2$p0$+2$q0$+$q1$+4)>>3)

$Q'_{(0,0)}$=Clip3($q0$−2$tc$,$q0$+2$tc$,($q2$+2$q1$+2$q0$+2$p0$+$p1$+4)>>3)=

$P'_{(1,0)}$=Clip3($p1$−2$tc$,$p1$+2$tc$,($p2$+$p1$+$p0$+$q0$+2)>>2)

$Q'_{(1,0)}$=Clip3($q1$−2$tc$,$q1$+2$tc$,($q2$+$q1$+$q0$+$p0$+2)>>2)  [Eq. 5]

For the convenience of descriptions, Eq. 5 illustrates a result of applying strong filtering only to P(0,0), P(1,0), Q(0,0), and Q(1,0), namely P'(0,0), P'(1,0), Q'(0,0), and Q'(1.0); however, by also applying strong filtering to P(0,1), P(1,1), P(0,2), P(1,2), P(0,3), P(1,3), Q(0,1), Q(1,1), Q(0,2), Q(1,2), Q(0,3), and Q(1,3), P'(0,1), P'(1,1), P'(0,2), P'(1,2), P'(0,3), P'(1,3), Q'(0,1), Q'(1,1), Q'(0,2), Q'(1,2), Q'(0,3), and Q'(1,3) may be derived.

Also, a strong filtering method proposed in the present invention proposes a method for using a new filter set as shown in FIGS. 28A and 28B.

FIGS. 28A and 28B illustrate a strong filtering method according to one embodiment of the present invention.

FIG. 28A illustrates pixels before filtering is applied according to one embodiment of the present invention, and FIG. 28B illustrates pixels (shaded pixels) after filtering is applied according to one embodiment of the present invention.

Referring to FIGS. 28A and 28B and Eq. 6, filtering may be applied only two pixels respectively on the left and right of a vertical edge (i.e., P(0,0), P(1,0), P(0,1), P(1,1), P(0,2), P(1,2), P(0,3), P(1,3), Q(0,0), Q(1,0), Q(0,1), Q(1,1), Q(0,2), Q(1,2), Q(0,3), Q(1,3)).

$P'_{(0,0)}$=Clip3($p0$−2$tc$,$p0$+2$tc$,($p2$+$p1$+2$p0$+$q0$+2)>>2)

$Q'_{(0,0)}$=Clip3($q0$−2$tc$,$q0$+2$tc$,($q1$+2$q0$+$p0$+2)>>2)

$P'_{(1,0)}$=Clip3($p1$−2$tc$,$p1$+2$tc$,($p2$+2$p1$+$p0$+2)>>2)

$Q'_{(1,0)}$=Clip3($q1$−2$tc$,$q1$+2$tc$,($q2$+2$q1$+$q0$+2)>>2)  [Eq. 6]

For the convenience of descriptions, Eq. 5 illustrates a result of applying strong filtering only to P(0,0), P(1,0), Q(0,0), and Q(1,0), namely P'(0,0), P'(1,0), Q'(0,0), and Q'(1.0); however, by also applying strong filtering to P(0,1), P(1,1), P(0,2), P(1,2), P(0,3), P(1,3), Q(0,1), Q(1,1), Q(0,2), Q(1,2), Q(0,3), and Q(1,3), P'(0,1), P'(1,1), P'(0,2), P'(1,2), P'(0,3), P'(1,3), Q'(0,1), Q'(1,1), Q'(0,2), Q'(1,2), Q'(0,3), and Q'(1,3) may be derived.

In Eqs. 5 and 6, p0, p1, and p2 correspond to P(0,0), P(1,0), and P(2,0), respectively; and q1, q2, and q3 correspond to Q(0,0), Q(1,0), and Q(2,0), respectively.

Also, in Eqs. 5 and 6, the clip3 function may be defined by Eq. 7.

$$\text{Clip 3}(x, y, z) = \begin{cases} x; & z < x \\ y; & z > y \\ z; & \text{otherwise} \end{cases} \quad [\text{Eq. 7}]$$

Also, in Eqs. 5 and 6, x>>y denotes the arithmetic right shift of two's complement of x by y binary digits. This function is defined only for non-negative integer values of y. The bit shifted to the most significant bit (MSB) as a result of the right shift has the same value as the MSB of x before the shift operation is applied.

Also, in Eqs. 5 and 6, the variable (parameter) tc (i.e., $t_c$) is determined based on the quantization parameter (Q).

Here, pertaining to a method for determining the variable (parameter) tc (i.e., $t_c$), the ITU-T H.265 document is incorporated by reference in the present specification.

As described above, the present embodiment may also minimize degradation of subjective image quality which may be caused as the de-blocking filter is not applied to small blocks in the conventional methods, and different from the embodiments 1 to 3, by applying the filter adaptively, degradation of image quality may also be minimized.

Embodiment 2

In the QTBT block partitioning structure, since conditions for applying and selecting a filter are examined by referring to the values of pixels filtered with respect to a preceding block boundary, a problem may occur.

Accordingly, for a de-blocking filter of QTBT structure, one embodiment of the present invention proposes a method for determining whether to perform filtering and determining an adaptive filter by referring to unfiltered pixels at the boundary of a block the horizontal length of which is 4 or less for filtering of vertical edges and at the boundary of a block the vertical length of which is 4 or less for filtering of horizontal edges.

In one embodiment of the present invention, the method is described with respect to a process of filtering vertical edges. The process of filtering horizontal edges is the same as the process of filtering vertical edges except for the difference that pixels on the top and bottom of a block boundary are referenced, and a vertical length is considered.

FIGS. 29A and 29B show a filtering result when vertical edge filtering is applied to a block the horizontal length of which is 4 or less.

FIG. 29A illustrates pixels before filtering is applied in a block the horizontal length of which is 4 or less at the time of filtering a vertical edge, and FIG. 29B illustrates pixels (shaded pixels) after filtering is applied.

One embodiment of the present invention proposes a method for using unfiltered pixels for determining whether to perform filtering and selecting a filter, as shown in FIGS. 30A through 30C.

FIGS. 30A through 30C illustrates a method for determining whether to perform filtering and selecting a filter according to one embodiment of the present invention.

For the blocks where a horizontal length between neighboring block boundaries is 4 or less, the decoder checks (b) the condition for performing filtering and (c) the condition for adaptively selecting a filter by using unfiltered pixels as shown in FIG. 30A.

In other words, the decoder may determine whether to perform filtering, as expressed by Eq. 8 below, by using unfiltered pixels in a block the horizontal length of which is 4 or less at the time of filtering a vertical edge.

①$dp0 = |p_{(2,0)} - 2 \times p_{(1,0)} + p_{(0,0)}|$

②$dp3 = |p_{(2,3)} - 2 \times p_{(1,3)} + p_{(0,3)}|$

③$dq0 = |q_{(2,0)} - 2 \times q_{(1,0)} + q_{(0,0)}|$

④$dq3 = |q_{(2,3)} - 2 \times q_{(1,0)} + q_{(0,0)}|$

⑤$dpq0 = dp0 + dq0$

⑥$dpq3 = dp3 + dq3$

⑦$d = dpq0 + dpq3$ [Eq. 8]

Also, at the time of filtering a vertical edge, the decoder may determine a filtering type as shown in Eq. 9 for a block the horizontal length of which is 4 or less by using the pixels before filtering is applied to other adjacent block boundaries.

①$(\beta >> 2) > 2 \times (dp0 + dq0)$

②$(\beta >> 2) > 2 \times (dp3 + dq3)$

③$(\beta >> 3) > \{(p_{(3,0)} - p_{(0,0)}) + (q_{(3,0)} - q_{(0,0)})\}$

④$(\beta >> 3) > \{(p_{(3,3)} - p_{(0,3)}) + (q_{(3,3)} - q_{(0,3)})\}$

⑤$((5 \times tc + 1) >> 1) > |p_{(0,0)} - q_{(0,0)}|$★

⑥$((5 \times tc + 1) >> 1) > |p_{(0,3)} - q_{(0,3)}|$ [Eq. 9]

Meanwhile, determining whether to perform filtering and the filter type by referring to filtered pixels applies only to a block boundary where the horizontal length to other adjacent block boundary is less than or equal to 4.

Due to these reasons, instead of determining reference pixels according to the block size (for example, a block the horizontal length of which is 4 or less, or a block the vertical length of which is 4 or less) to determine whether to perform filtering and the filter type, the present invention proposes a method for referencing unfiltered pixels to determine whether to perform filtering and the filter type for all of block boundaries.

FIG. 31 illustrates a de-blocking filtering method according to one embodiment of the present invention.

Referring to FIG. 31, a decoder determines whether a it corresponds to a boundary of a coding unit (or coding block) S3101.

If it does not correspond to a boundary of a coding unit (or coding block) at the S3101 step, the decoder terminates de-blocking filtering.

On the other hand, if a pixel corresponds to a boundary of a coding unit (or coding block) at the S3101 step, the decoder checks a condition for applying a de-blocking filter S3102 and determines whether to apply a de-blocking filter at the corresponding boundary based on the condition for applying a de-blocking filter S3103.

At this time, to determine whether to apply a de-blocking filter, the decoder may use the picture composed of unfiltered pixels as an input.

At this time, Eq. 8 above may be used as the condition for applying a de-blocking filter.

If the decoder determines not to apply a de-blocking filter at the boundary of a coding unit (or coding block) at the S3103 step (i.e., the condition for applying a de-blocking filter is not satisfied), the decoder terminates de-blocking filtering.

On the other hand, if the decoder determines to apply a de-blocking filter at the boundary of a coding unit (or coding block) at the S3103 step (i.e., the condition for applying a de-blocking filter is satisfied), the decoder checks a condition for selecting a filter set S3104 and determines whether to apply a strong filter at the corresponding boundary based on the condition for selecting a filter set S3105.

At this time, to determine whether to apply a strong filter, the decoder may use the picture composed of unfiltered pixels as an input.

At this time, Eq. 9 may be used as the condition for selecting a filter set.

If it is determined to apply a strong filter at the S3105 step (for example, if the conditions expressed by Eq. 9 are all satisfied), the decoder may apply a strong filter to the corresponding boundary S3106.

At this time, to apply a strong filter, the decoder may use a reconstructed picture as an input.

At this time, pertaining to the application of a strong filter, the methods proposed in the embodiments 1 to 4 may be used.

Here, for example, pertaining to a method for applying a strong filter, the ITU-T H.265 document may be incorporated by reference in the present specification.

Meanwhile, if it is determined not to apply a strong filter at the S3105 step (for example, if any one of the conditions of Eq. 9 is not satisfied), the decoder may apply a weak filter to the corresponding edge S3107.

At this time, to apply a weak filter, the decoder may use a reconstructed picture as an input.

Here, for example, pertaining to a method for applying a weak filter, the ITU-T H.265 document may be incorporated by reference in the present specification.

At the S3106 and S4107 steps, the pixels for which a strong filter has been applied and the pixels for which a weak filter has been applied may be reflected in the reconstructed picture as an output.

As shown in FIG. 31, the decoder may determine whether to apply a filter and whether a condition for selecting a filter set is satisfied by referring to unfiltered pixels but may use decoded pixels for actual filtering.

As described above, according to the present embodiment, when whether to apply filtering at a block boundary is determined for parallel implementation of de-blocking filtering, the filtering is determined by referring to unfiltered pixels rather than the pixels which have already been filtered with respect to adjacent block boundaries, thereby enabling parallel implementation.

Embodiment 3

One embodiment of the present invention proposes a method for performing de-blocking filtering adaptively on the chroma component in the QTBT structure.

In the QTBT partitioning structure, an I-slice may be subdivided such that a luma region and a chroma region have a different block structure. Since the chroma and luma components have different block edges, filtering is performed separately by checking block boundaries for which the filtering is applied.

However, if the conventional HEVC de-blocking method is used directly, a problem is occurred that BS is calculated under the same condition for the luma component, and filtering is performed on the block boundaries where BS is 2.

FIG. 32 illustrates a problem caused when HEVC de-blocking filtering is applied in the same manner to the QTBT block partitioning structure.

Referring to FIG. 32, a decoder starts a picture loop filter (loopFilterPic) process and if the channel type is luma S3201, performs a CU de-blocking (xDeblockCU) process S3202, S3203.

In FIG. 32, the process inside a box with a dotted line illustrates the xDeblockCU.

The decoder determines whether the slice type is I-slice S3204.

If the slice type is I-slice at the S3204 step, and the channel type is chroma S3205, the CU de-blocking (xDeblockCU) process is performed S3202, S3203.

Meanwhile, if the slice type is not I-slice at the S3204 step, the decoder terminates the picture loop filter (loopFilterPic) process.

The decoder determines whether the current block (for example, a CTU or a block subdivided from a CTU according to the QTBT structure) is subdivided into a quad-tree (QT) structure S3206.

If the current block is subdivided into the quad-tree (QT) structure at the S3206 step, the width value thereof is right shifted by 1 (width>>1), and also the height value is right shifted by 1 (height>>10 S3207. In other words, the current block is subdivided by half along the vertical and horizontal directions.

The decoder performs the CU de-blocking (xDeblockCU) process on each of the four subdivided blocks S3208, 3209.

On the other hand, if the current block is not subdivided into the quad-tree (QT) structure at the S3206 step, the decoder determines whether the current block is subdivided into a binary-tree (BT) structure S3210.

If the current block is subdivided into a binary-tree (BT) structure at the S3210 step, the decoder determines whether the BT mode is horizontal subdivision S3211.

If the BT mode is horizontal subdivision at the S3211 step, the decoder shifts only the height value to the right by 1 (height>>1) S3212. In other words, the current block is subdivided by half along the horizontal direction. And the decoder performs the CU de-blocking (xDeblockCU) process for each of the two subdivided blocks S3213, S3214.

On the other hand, if the BT mode is not horizontal subdivision at the S3211 step, the decoder shifts only the width value to the right by 1 (width>>1) S3215. In other words, the current block is subdivided by half along the vertical direction. And the decoder performs the CU de-blocking (xDeblockCU) process for each of the two subdivided blocks S3216, S3217.

On the other hand, if the current block is not subdivided into the binary-tree (BT) structure at the S3210 step, the decoder calculates boundary strength (BS) or boundary filtering strength S3218.

The decoder determines whether the current block is a luma block S3219.

If the current block is a luma block at the S3219 step, the decoder performs filtering on the edges of the luma block S3220.

In other words, as shown in Eqs. 1 and 2, the decoder may determine whether to apply a de-blocking filter and determine the filter type if de-blocking is applied, after which the decoder may perform de-blocking filtering according to the determined filter type.

Meanwhile, if the current block is not a luma block at the S3219 step, when the current block is a chroma block or is not the I-slice; and the chroma component format is not 4:0:0 (!400) S3221, the decoder performs filtering (xEdgeFilterChroma) on the edges of the chroma block S3222.

In other words, as shown in Eqs. 1 and 2, the decoder may determine whether to apply a de-blocking filter and determine the filter type if de-blocking is applied, after which the decoder may perform de-blocking filtering according to the determined filter type.

As shown in FIG. 32, if the BS value calculated under the same condition for the luma component is 2, without involving calculation about whether to perform separate filtering on the edges of a chroma block, the filtering process on the edges of the chroma block (xEdgeFilterChroma) is performed.

Therefore, a problem arises that a de-blocking filter is not performed efficiently on the chroma component of the I-slice.

To solve the problem above, one embodiment of the present invention proposes a method for applying a de-blocking filter to the chroma component as shown in FIG. 33.

FIG. 33 illustrates a de-blocking filtering method according to one embodiment of the present invention.

Referring to FIG. 33, a decoder starts a picture loop filter (loopFilterPic) process and if the channel type is luma S3301, performs a CU de-blocking (xDeblockCU) process S3302, S3303.

In FIG. 33, the process inside a box with a dotted line illustrates the xDeblockCU.

The decoder determines whether the slice type is I-slice S3304.

If the slice type is I-slice at the S3304 step, and the channel type is chroma S3305, the CU de-blocking (xDeblockCU) process is performed S3302, S3303.

Meanwhile, if the slice type is not I-slice at the S3304 step, the decoder terminates the picture loop filter (loopFilterPic) process.

The decoder determines whether the current block (for example, a CTU or a block subdivided from a CTU according to the QTBT structure) is subdivided into a quad-tree (QT) structure S3306.

If the current block is subdivided into the quad-tree (QT) structure at the S3306 step, the width value thereof is right shifted by 1 (width>>1), and also the height value is right shifted by 1 (height>>10 S3307. In other words, the current block is subdivided by half along the vertical and horizontal directions.

The decoder performs the CU de-blocking (xDeblockCU) process on each of the four subdivided blocks S3308, 3309.

On the other hand, if the current block is not subdivided into the quad-tree (QT) structure at the S3306 step, the decoder determines whether the current block is subdivided into a binary-tree (BT) structure S3310.

If the current block is subdivided into a binary-tree (BT) structure at the S3310 step, the decoder determines whether the BT mode is horizontal subdivision S3311.

If the BT mode is horizontal subdivision at the S3311 step, the decoder shifts only the height value to the right by 1 (height>>1) S3312. In other words, the current block is subdivided by half along the horizontal direction. And the decoder performs the CU de-blocking (xDeblockCU) process for each of the two subdivided blocks S3313, S3314.

On the other hand, if the BT mode is not horizontal subdivision at the S3311 step, the decoder shifts only the width value to the right by 1 (width>>1) S3315. In other words, the current block is subdivided by half along the vertical direction. And the decoder performs the CU de-blocking (xDeblockCU) process for each of the two subdivided blocks S3316, S3317.

On the other hand, if the current block is not subdivided into the binary-tree (BT) structure at the S3310 step, the decoder calculates boundary strength (BS) or boundary filtering strength S3318.

The decoder determines whether a slice to which the current block belongs is the I-slice S3319.

If the slice to which the current block belongs is not the I-slice at the S3319 step, the decoder determined whether the current block is a luma block S3320.

If the slice to which the current block belongs is the I-slice at the S3319 step or if the current block is a luma block at the S3320 step, the decoder performs filtering on the edges of the luma block (xEdgeFilterLuma) S3221.

In other words, if a slice to which the current block belongs is the I-slice, the decoder may additionally calculate (determine) whether to perform filtering at block boundaries in the same way as performed on the luma component even though the current block is a chroma channel and apply strong and weak filtering selectively thereto.

At this time, a method for determining whether to perform filtering and/or determining a filtering type (for example, strong or weak filtering) may use the methods described in the embodiment 1 and/or 2 above.

Similarly, pertaining to a method for determining whether to perform filtering and/or determining a filtering type (for example, strong or weak filtering), the ITU-T H.265 document may be incorporated by reference in the present specification.

Meanwhile, if the current block is not a luma block at the S3320 step, when the current block is a chroma block, and the chroma component format is not 4:0:0 (i.e., !400) S3322, the decoder performs filtering (xEdgeFilterChroma) on the edges of the chroma block S3223.

In other words, in the case of a B-slice where the luma and chroma block structures are the same, filtering may be performed at block boundaries where BS is 2 or more, as performed in the existing method.

FIG. 33 illustrates a de-blocking filtering method according to one embodiment of the present invention.

Referring to FIG. 33, a decoder extracts an edge of a block subdivided in a quad-tree and binary-tree structures S3301.

Among the block boundaries, the decoder determines an edge to which de-blocking filtering is to be applied S3302.

In other words, the decoder determines an edge to which de-blocking filtering is to be applied from among block boundaries.

At this time, the edge may be determined by taking into account the width or height of the block.

For example, as in the embodiment 1-1, when the edge type is a vertical edge, if the block width is 4 or less, an edge may be determined based on the pixels for which de-blocking filtering has been already applied. Also, when the edge type is a horizontal edge, if the block height is 4 or less, an edge may be determined based on the pixels for which de-blocking filtering has been already applied.

In another example, as in the embodiment 1-2, when the edge type is a vertical edge, edges may be determined only from among the boundaries of a block the width of which is 8 or more (namely, filtering is not applied to the boundaries of a block the width of which is 4 or less). Similarly, when the edge type is a horizontal edge, edges may be determined only from among the boundaries of a block the height of which is 8 or more (namely, filtering is not applied to the boundaries of a block the height of which is 4 or less).

In yet another example, as in the embodiment 2, an edge may also be determined based on pixels before de-blocking filtering is applied.

The decoder determines the type of de-blocking filtering to be applied to the edge S3303.

For example, the decoder may determine whether strong or weak filtering is applied to the edge.

At this time, the de-blocking filter type may be determined by considering the width or height of the block.

For example, as in the embodiment 1-1, if the edge type is a vertical edge, and the block width is 4 or less, the de-blocking filtering type may be determined based on pixels to which de-blocking filtering has been already applied. Similarly, if the edge type is a horizontal edge, and the block height is 4 or less, the de-blocking filtering type may be determined based on pixels to which de-blocking filtering has been already applied.

In another example, as in the embodiment 1-3, if the edge type is a vertical edge, and the block width is 4 or less, the de-blocking filtering type may be determined as weak filtering. Similarly, if the edge type is a horizontal edge, and the block height is 4 or less, the de-blocking filtering type may be determined as weak filtering.

In yet another example, as in the embodiment 1-4, if the edge type is a vertical edge, and the block width is 4 or less, the de-blocking filtering type may be determined as strong filtering, and the strong filtering may be applied only to two pixel columns respectively on the left and right of the edge. Similarly, if the edge type is a horizontal edge, and the block height is 4 or less, the de-blocking filtering type may be determined as weak filtering, and the strong filtering may be applied only to two pixel columns respectively on the top and bottom of the edge.

In still another example, as in the embodiment 2, the de-blocking filtering type may be determined based on the pixels before de-blocking filtering is applied.

In still yet another example, as in the embodiment 3, if a slice to which a block belongs is I-slice, an edge is determined at the S3302 step irrespective of whether the block is a chroma block, and the de-blocking filtering type may be determined at the S3303 step.

The decoder performs de-blocking filtering on the reconstructed picture samples according to the de-blocking filtering type S3304.

FIG. 35 illustrates a de-blocking filtering unit according to one embodiment of the present invention.

Referring to FIG. 35, a de-blocking filtering unit implements the functions, processes and/or methods proposed in FIGS. 6 to 34 above. Also, by being combined with the whole or part of the constituting elements of the encoder illustrated in FIG. 1, the de-blocking filtering unit may be implemented as an encoding apparatus, or by being combined with the whole or part of the constituting elements of the decoder illustrated in FIG. 2, the de-blocking filtering unit may be implemented as a decoding apparatus.

More specifically, the de-blocking filtering unit may comprise a block boundary extracting unit 3501, edge determining unit 3502, filtering type determining unit 3503, and filtering unit 3504.

The block boundary extracting unit 3501 extracts boundaries of blocks subdivided in a quad-tree and binary-tree structures.

The edge determining unit 3502 determines the edges to which de-blocking filtering is to be applied.

In other words, the edge determining unit 3502 determines the edges to which de-blocking filtering is applied among block boundaries.

At this time, an edge may be determined by considering the width or height of a block.

For example, as in the embodiment 1-1, if the edge type is a vertical edge, and the block width is 4 or less, an edge may be determined based on pixels to which de-blocking filtering has been already applied. Also, if the edge type is horizontal edge, and the block height is 4 or less, an edge may be determined based on pixels to which de-blocking filtering has been already applied.

In another example, as in the embodiment 1-2, if the edge type is a vertical edge, and the block width is 8 or larger, an edge may be determined only among the boundaries of a block the width of which is 8 or larger (namely, filtering is not applied for the boundaries of a block the width of which is 4 or less). Also, if the edge type is horizontal edge, and the block height is 8 or larger, an edge may be determined only among the boundaries of a block the height of which is 8 or larger (namely, filtering is not applied for the boundaries of a block the height of which is 4 or less).

In yet another example, as in the embodiment 2, an edge may be determined based on the pixels before de-blocking filtering is applied.

The filtering type determining unit 3503 determines the type of de-blocking filtering to be applied to an edge.

For example, the filtering type determining unit 3503 may determine whether strong or weak filtering is applied to an edge.

At this time, the type of de-blocking filtering may be determined by considering the width or height of a block.

For example, as in the embodiment 1-1, if the edge type is a vertical edge, and the block width is 4 or less, the type of de-blocking filtering may be determined based on pixels to which de-blocking filtering has been already applied. Also, if the edge type is a horizontal edge, and the block height is 4 or less, the type of de-blocking filtering may be determined based on pixels to which de-blocking filtering has been already applied.

In another example, as in the embodiment 1-3, if the edge type is a vertical edge, and the block width is 4 or less, the type of de-blocking filtering may be determined as weak filtering. Also, if the edge type is a horizontal edge, and the block height is 4 or less, the type of de-blocking filtering may be determined as weak filtering.

In yet another example, as in the embodiment 1-4, if the edge type is a vertical edge, and the block width is 4 or less, the type of de-blocking filtering may be determined as strong filtering, and the strong filtering may be applied only to two pixel columns respectively on the left and right of the edge. Also, if the edge type is a horizontal edge, and the block height is 4 or less, the type of de-blocking filtering may be determined as strong filtering, and the strong filtering may be applied only to two pixel columns respectively on the left and right of the edge.

In still another example, as in the embodiment 2, the type of de-blocking filtering may be determined based on the pixels before de-blocking filtering is applied.

In still yet another example, as in the embodiment 3, if a slice to which a block belongs is I-slice, an edge is determined at the S3302 step irrespective of whether the block is a chroma block, and the de-blocking filtering type may be determined at the S3303 step.

The filtering unit 3504 performs de-blocking filtering on the reconstructed picture samples according to the de-blocking filtering type.

Embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an exemplary embodiment of the present invention or included as a new claim by a subsequent amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The above-described preferred embodiments of the present invention are illustrative only and are not intended to represent all aspects of the invention, and those skilled in the art should understood that the invention is to cover all modifications, equivalents, and alternatives falling within the spirit and scope of the invention.

The invention claimed is:

1. A method for decoding an image by a decoding apparatus, comprising:
   deriving boundaries of a luma block and a chroma block in a current picture divided according to a partitioning structure;
   determining an edge to apply a de-blocking filter among the boundaries of the luma block and the chroma block;
   determining a type of the de-blocking filter for the determined edge of the luma block based on width or height of the luma block;
   determining a type of the de-blocking filter for the determined edge of the chroma block based on the chroma block being an intra prediction block; and
   applying the de-blocking filter the type of which is determined on reconstructed samples around the determined edge, and
   wherein, based on that the type of the edge is a vertical edge, and the width of the luma block is less than or equal to 4, the type of the de-blocking filter for the luma block is determined as a weak filter,
   wherein, based on that the type of the edge is a horizontal edge, and the height of the luma block is less than or equal to 4, the type of the de-blocking filter for the luma block is determined as the weak filter, and
   wherein the types of the de-blocking filter for the luma block and the chroma block are determined based on reconstructed samples of the current picture before the de-blocking filter is applied.

2. The method of claim 1, wherein, when the edge is a vertical edge, the edge is determined only among boundaries of the luma block of which the width is larger than or equal to 8.

3. The method of claim 1, wherein, when the edge is a horizontal edge, the edge is determined only among boundaries of the luma block of which the height is larger than or equal to 8.

4. The method of claim 1, wherein, when the edge is a vertical edge and the width of the luma block is smaller than or equal to 4, the type of the de-blocking filter for the luma block is determined as a strong filter, and the strong filter is applied to only two adjacent pixel columns on left and right of the edge.

5. The method of claim 1, wherein, when the edge is a horizontal edge and the height of the block is smaller than or equal to 4, the type of the de-blocking filter for the luma block is determined as a strong filter, and the strong filter is applied to only two adjacent pixel rows on the top and bottom of the edge.

6. A method of encoding an image by an encoding apparatus, comprising:
   deriving boundaries of a luma block and a chroma block in a current picture divided according to a partitioning structure;
   determining an edge to apply a de-blocking filter among the boundaries of the luma block and the chroma block;
   determining a type of the de-blocking filter for the determined edge of the luma block based on width or height of the luma block;
   determining a type of the de-blocking filter for the determined edge of the chroma block based on the chroma block being an intra prediction block; and
   applying the de-blocking filter the type of which is determined on reconstructed samples around the determined edge, and
   wherein, based on that the type of the edge is a vertical edge, and the width of the luma block is less than or equal to 4, the type of the de-blocking filter for the luma block is determined as a weak filter,
   wherein, based on that the type of the edge is a horizontal edge, and the height of the luma block is less than or equal to 4, the type of the de-blocking filter for the luma block is determined as the weak filter, and
   wherein the types of the de-blocking filter for the luma block and the chroma block are determined based on reconstructed samples of the current picture before the de-blocking filter is applied.

7. A transmission method for data comprising a bitstream including an image by an apparatus, the method comprising:
   obtaining the bitstream for the image, and
   transmitting the data comprising the bitstream,
   wherein the bitstream is generated by performing the steps of:
   deriving boundaries of a luma block and a chroma block in the image divided according to a partitioning structure;
   determining an edge to apply a de-blocking filter among the boundaries of the luma block and the chroma block;
   determining a type of the de-blocking filter for the determined edge of the luma block based on width or height of the luma block;
   determining a type of the de-blocking filter for the determined edge of the chroma block based on the chroma block being an intra prediction block; and
   applying the de-blocking filter the type of which is determined on reconstructed samples around the determined edge, and
   wherein, based on that the type of the edge is a vertical edge, and the width of the luma block is less than or equal to 4, the type of the de-blocking filter for the luma block is determined as a weak filter,
   wherein, based on that the type of the edge is a horizontal edge, and the height of the luma block is less than or equal to 4, the type of the de-blocking filter for the luma block is determined as the weak filter, and
   wherein the types of the de-blocking filter for the luma block and the chroma block are determined based on reconstructed samples of the current picture before the de-blocking filter is applied.

* * * * *